United States Patent
Adachi et al.

(10) Patent No.: US 7,742,137 B2
(45) Date of Patent: Jun. 22, 2010

(54) DISPLAY DEVICE AND ELECTRICAL APPLIANCE USING THE SAME

(75) Inventors: Masaya Adachi, Hitachi (JP); Makiko Sugibayashi, Hitachi (JP); Tetsuya Ohshima, Mobara (JP); Katsumi Kondo, Mito (JP); Hiroshi Sasaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 590 days.

(21) Appl. No.: 11/502,436

(22) Filed: Aug. 11, 2006

(65) Prior Publication Data

US 2007/0046874 A1 Mar. 1, 2007

(30) Foreign Application Priority Data

Aug. 12, 2005 (JP) .............................. 2005-233901

(51) Int. Cl.
G02F 1/1333 (2006.01)

(52) U.S. Cl. ...................... 349/122; 313/479

(58) Field of Classification Search .................. 349/56, 349/58, 60, 84, 122, 139, 141, 142, 187, 349/190
See application file for complete search history.

(56) References Cited

U.S. PATENT DOCUMENTS

| | | | | |
|---|---|---|---|---|
| 2,877,342 A * | 3/1959 | Beach | ................. | 362/309 |
| 3,020,395 A * | 2/1962 | Peltz | ................. | 362/330 |
| 3,668,381 A * | 6/1972 | Schwartz et al. | ........... | 362/339 |
| 3,725,697 A * | 4/1973 | Wince | ................. | 362/294 |
| 4,068,925 A * | 1/1978 | Tani et al. | ................. | 349/129 |
| 4,715,686 A * | 12/1987 | Iwashita et al. | ............. | 349/137 |
| 4,729,640 A * | 3/1988 | Sakata | ................. | 349/201 |
| 4,936,657 A * | 6/1990 | Tejima et al. | ................. | 349/7 |
| 4,945,282 A * | 7/1990 | Kawamura et al. | ........... | 313/479 |
| 5,300,263 A * | 4/1994 | Hoopman et al. | ............. | 264/2.5 |
| 5,439,621 A * | 8/1995 | Hoopman | ................. | 264/2.5 |
| 5,554,432 A * | 9/1996 | Sandor et al. | ............... | 428/157 |
| 5,592,332 A * | 1/1997 | Nishio et al. | ................. | 359/619 |
| 5,742,118 A * | 4/1998 | Endo et al. | ................. | 313/479 |
| 5,889,612 A * | 3/1999 | Van De Ven | ................. | 359/453 |
| 5,980,454 A * | 11/1999 | Broome | ................. | 600/176 |
| 5,995,190 A * | 11/1999 | Nagae et al. | ................. | 349/156 |
| 6,008,940 A * | 12/1999 | Michihata et al. | ........... | 359/483 |
| 6,049,649 A * | 4/2000 | Arai | ................. | 385/133 |
| 6,175,398 B1 * | 1/2001 | Yamada et al. | ................. | 349/96 |
| 6,315,848 B1 * | 11/2001 | Kondo | ................. | 156/99 |
| 6,319,594 B1 * | 11/2001 | Suzuki et al. | ................. | 428/208 |
| 6,329,061 B2 * | 12/2001 | Kondo | ................. | 428/432 |
| 6,582,095 B1 * | 6/2003 | Toyoda | ................. | 362/235 |

(Continued)

FOREIGN PATENT DOCUMENTS

JP 55140817 A * 11/1980

(Continued)

*Primary Examiner*—Frank G Font
*Assistant Examiner*—Peter Radkowski
(74) *Attorney, Agent, or Firm*—Antonelli, Terry, Stout & Kraus, LLP.

(57) ABSTRACT

A liquid crystal display device comprising a pair of substrates, a liquid crystal display panel having a liquid crystal layer positioned between the substrates, a transparent protective plate arranged on a front surface side of the display panel, and an optically transparent layer between the display panel and the protective plate, and wherein the protective plate includes fine concavity and convexity configurations on at least a surface thereof toward the display panel.

28 Claims, 13 Drawing Sheets

U.S. PATENT DOCUMENTS

| | | | |
|---|---|---|---|
| 6,661,552 B2* | 12/2003 | Hira | 359/237 |
| 6,661,610 B1* | 12/2003 | Iwasaki | 360/134 |
| 6,669,350 B2* | 12/2003 | Yamashita et al. | 362/612 |
| 6,767,105 B2* | 7/2004 | Nakahashi et al. | 362/27 |
| 6,865,834 B2* | 3/2005 | Oda et al. | 40/454 |
| 6,870,681 B1* | 3/2005 | Magee | 359/626 |
| 6,982,833 B2* | 1/2006 | Nemoto | 359/626 |
| 7,006,293 B2* | 2/2006 | Kuo et al. | 359/599 |
| 7,192,166 B2* | 3/2007 | Shimura | 362/331 |
| 7,201,510 B2* | 4/2007 | Yamashita et al. | 362/617 |
| 7,268,840 B2* | 9/2007 | Akiyama et al. | 349/61 |
| 7,380,968 B2* | 6/2008 | Yamashita et al. | 362/611 |
| 7,380,969 B2* | 6/2008 | Yamashita et al. | 362/612 |
| 7,400,439 B2* | 7/2008 | Holman | 359/298 |
| 2001/0012149 A1* | 8/2001 | Lin et al. | 359/344 |
| 2002/0153845 A1* | 10/2002 | Lee et al. | 315/169.3 |
| 2002/0163728 A1* | 11/2002 | Myers | 359/613 |
| 2002/0163790 A1* | 11/2002 | Yamashita et al. | 362/31 |
| 2003/0021123 A1* | 1/2003 | Nakahashi et al. | 362/560 |
| 2003/0046839 A1* | 3/2003 | Oda et al. | 40/454 |
| 2003/0081312 A1* | 5/2003 | Nemoto et al. | 359/454 |
| 2003/0085649 A1* | 5/2003 | Wachi et al. | 313/479 |
| 2004/0012945 A1* | 1/2004 | Yamashita et al. | 362/31 |
| 2005/0041175 A1* | 2/2005 | Akiyama et al. | 349/62 |
| 2005/0046949 A1* | 3/2005 | Kuo et al. | 359/599 |
| 2005/0057804 A1* | 3/2005 | Umeya et al. | 359/449 |
| 2005/0083571 A1* | 4/2005 | Shimizu | 359/456 |
| 2005/0083572 A1* | 4/2005 | Shimizu | 359/460 |
| 2005/0094384 A1* | 5/2005 | Yamashita et al. | 362/31 |
| 2005/0122588 A1* | 6/2005 | Kunisada et al. | 359/585 |
| 2006/0050200 A1* | 3/2006 | Nagao | 349/65 |
| 2006/0077367 A1* | 4/2006 | Kobayashi et al. | 355/53 |
| 2006/0163759 A1* | 7/2006 | Maruyama et al. | 261/137 |
| 2006/0215269 A1* | 9/2006 | Abe et al. | 359/619 |
| 2006/0291243 A1* | 12/2006 | Niioka et al. | 362/607 |
| 2007/0002583 A1* | 1/2007 | Lee et al. | 362/606 |
| 2007/0064210 A1* | 3/2007 | Kobayashi et al. | 355/53 |
| 2007/0132968 A1* | 6/2007 | Kobayashi et al. | 355/30 |
| 2007/0207694 A1* | 9/2007 | Yoda et al. | 445/24 |
| 2007/0216851 A1* | 9/2007 | Matsumoto | 349/200 |
| 2007/0241673 A1* | 10/2007 | Yamada et al. | 313/506 |
| 2008/0019146 A1* | 1/2008 | Wang et al. | 362/606 |
| 2008/0055926 A1* | 3/2008 | Yamashita et al. | 362/606 |
| 2008/0102387 A1* | 5/2008 | Yukiko | 430/20 |
| 2008/0144336 A1* | 6/2008 | Yamashita et al. | 362/620 |

FOREIGN PATENT DOCUMENTS

| | | | |
|---|---|---|---|
| JP | 05-011239 | | 1/1993 |
| JP | 06282011 A | * | 10/1994 |
| JP | 06347613 A | * | 12/1994 |
| JP | 09197387 A | * | 7/1997 |
| JP | 09318932 A | * | 12/1997 |
| JP | 2003004950 A | * | 1/2003 |
| JP | 2003066419 A | * | 3/2003 |
| JP | 2005-249982 | | 9/2005 |
| JP | 2006-145709 | | 6/2006 |
| JP | 2007033803 A | * | 2/2007 |

* cited by examiner

DISPLAY DEVICE AND ELECTRICAL APPLIANCE USING THE SAME

BACKGROUND OF THE INVENTION

The present invention relates to a display device, and more particular, to a display device provided on a front surface side thereof with a transparent protective plate. Further, the present invention relates to an appliance provided with such display device.

As display devices mounted on portable appliances such as portable telephones, etc. there are liquid crystal display devices and organic electroluminescence display devices. While these display devices are of a passive drive type and of an active matrix drive type, detailed constructions and operations thereof are well known and so an explanation therefor is omitted.

In the case where these display devices are mounted on portable appliances such as portable telephones, etc., a transparent protective plate is provided on a front surface of a display device in order to prevent an action of a mechanical force applied from outside from disordering or breaking display.

Since a protective plate is different in refractive index from an air, reflection is generated on an interface between the protective plate and an air. That is, with a display device provided with a protective plate, unnecessary interfacial reflection is generated on a front surface and a back surface of the protective plate, so that visibility of the display device is considerably impaired especially in the case where surrounding environment is bright.

As measures to suppress unnecessary reflection generated due to the provision of a protective plate, for example, JP-A-5-11239 discloses a display device, in which an external light reflection preventive layer made of a liquid material having substantially the same refractive index as that of the protective plate is provided between the protective plate and the display device.

In this case, it is possible to suppress reflection on a boundary surface between the protective plate and the external light reflection preventive layer and between the external light reflection preventive layer and the display device.

In the case where an optically transparent layer made of a liquid material is filled as an external light reflection preventive layer between a protective plate and a display device, measures to surround a periphery of the layer with a sealing material becomes necessary in order to prevent leakage of the optically transparent layer from between the protective plate and the display device, thus involving complexity in process and construction.

Therefore, the inventors of the present invention have examined application of a sheet-shaped material as an optically transparent layer instead of a liquid material because the material is favorable in handling and workability. Several problems are caused in application of a sheet-shaped material as an optically transparent layer.

Generally, both a protective plate and a display device are hard, so that in the case where a sheet-shaped material is stuck between hard substances, bubbles are liable to interpose therebetween. In the case where bubbles interpose between an optically transparent layer made of a sheet-shaped material and a protective plate, or between an optically transparent layer and a display device, there is caused a problem that display is degraded in quality since unnecessary reflection is generated in a region, in which bubbles are present.

Also, since a conventional construction includes a clearance composed of an air between a protective plate and a display device, it protects the display device because no force reaches the display device directly even when a mechanical force is applied from outside to deform the protective plate. When a sheet-shaped optically transparent layer is filled between a protective plate and a display device, however, a mechanical force applied to the protective plate from outside becomes liable to be transmitted to the display device and inconvenience attributable thereto is liable to generate.

The invention has been thought of in order to solve such problem in the related art and has its object to realize a display device, in which entrained bubbles are little and display of high quality is obtained.

Also, it is an object of the invention to provide a display device, in which inconvenience is hard to occur even when a mechanical force is applied from outside.

Other tasks and novel features of the invention will be made apparent with reference to descriptions and accompanying drawings of the specification of the present application.

SUMMARY OF THE INVENTION

The invention adopts, for example, the following means in order to attain the objects described above.

A display device comprises a display panel, a transparent, protective plate arranged on a front surface side of the display panel, and an optically transparent layer between the display panel and the protective plate, wherein the protective plate includes fine concavity and convexity configurations on at least a surface thereof on a side of the display panel.

In this case, bubbles trapped when the protective plate and the optically transparent layer are brought into contact with each other release from clearances between the concavities and convexities formed on the protective plate upon application of pressure, so that it is possible to inhibit bubbles from remaining.

In addition, while the concavities and convexities formed on the protective plate may have a cross sectional shape of triangular waves or rectangular waves, they are desirably wave-shaped without corners in order to make the optically transparent layer easily come into close contact with the protective plate. Also, while heights of the concavities and convexities formed on the protective plate are different in optimum value in dependent on the elasticity of the optically transparent layer, at least 1 µm is preferable from the viewpoint of preventing bubbles from remaining and at most 25 µm is desirable from the viewpoint of stability after close contact. Also, the concavity and convexity configurations desirably have a pitch ½ or more than heights of the concavities and convexities in order to make the optically transparent layer liable to come into close contact with the protective plate.

Also, by making the concavities and convexities formed on the protective plate groove-shaped, it is possible to decrease deflection in the case where a mechanical force is applied to the protective plate from outside. That is, since projections formed on the protective plate function also as ribs, it is possible to restrict a force applied to the display panel in the case where a mechanical force is applied from outside. The grooves may be directed in parallel to or perpendicular to a longitudinal direction of the screen, or shaped to extend radially outward from a center thereof.

Also, a display device comprises a display panel, a transparent protective plate arranged on a front surface side of the display panel, and an optically transparent layer between the display panel and the protective plate, wherein at least a center and/or neighborhood of the center of a surface of the protective plate on a side of the display panel is bulged from a periphery thereof.

In this case, when the protective plate is caused to overlap the optically transparent layer, the protective plate and the optically transparent layer begin to contact with each other at central portions and neighborhoods of the center and bubbles are pushed out toward peripheral portions upon application of pressure, so that it is possible to inhibit bubbles from remaining.

At this time, it is desirable that a bulging amount of the protective plate on the side of the display panel be smaller than a thickness of the optically transparent layer. The reason for this is that in the case where a bulging amount of the protective plate on the side of the display panel is larger than a thickness of the optically transparent layer, the protective plate and the optically transparent layer become liable to peel off at the peripheral portion of the protective plate due to the elasticity of the optically transparent layer.

Also, a display device comprises a display panel, a transparent protective plate arranged on a front surface side of the display panel, and an optically transparent layer between the display panel and the protective plate, wherein the protective plate comprises a nano pore layer including voids having a magnitude of several nano to several tens of nano on at least a surface thereof on a side of the display panel.

In this case, bubbles trapped when the protective plate and the optically transparent layer are brought into contact with each other are dispersed in the nano pore layer upon application of pressure, and a part of the bubbles is discharged through the nano pore layer, or the bubbles become smaller than a wavelength of light to become invisible.

Also, a display device comprises a display panel, a transparent protective plate arranged on a front surface side of the display panel, and an optically transparent layer between the display panel and the protective plate, wherein the optically transparent layer comprises a transparent sheet material and an end thereof is smaller in thickness than a central portion thereof.

In this case, bubbles trapped when the protective plate and the optically transparent layer are brought into contact with each other becomes liable to be discharged from the end of the optically transparent layer upon application of pressure, so that it is possible to inhibit bubbles from remaining. Also, while a colored layer such as frame, logo, etc. is generally printed on a surface of a protective plate on a side of a display panel, such colored layer is higher than a surface of the protective plate to define a difference in level, so that bubbles are liable to remain there. However, generation of bubbles caused by a difference in level on a printed surface is suppressed by making an end of the optically transparent layer thin and arranging such thin portion in a position corresponding the difference in level on the printed surface of the protective plate. Also, in the case where the optically transparent layer is different in coefficient of thermal expansion from the display panel, the optically transparent layer becomes liable to absorb dimensional changes caused by changes in environmental temperature.

Also, a display device comprises a display panel, a transparent protective plate arranged on a front surface side of the display panel, and an optically transparent layer between the display panel and the protective plate, wherein a colored layer is provided on a surface of the protective plate on a side of the display panel and a flattened layer is further provided on the colored layer.

In this case, since the difference in level, caused by the colored layer on the protective plate is relieved by the flattened layer, generation of bubbles caused by the difference in level on the colored layer can be suppressed.

Also, a display device comprises a display panel and a transparent protective plate arranged on a front surface side of the display panel, wherein an optically transparent plate is provided between the display panel and the protective plate and optically transparent layers are respectively provided between the display panel and the optically transparent plate and between the optically transparent plate and the protective plate.

In this case, when a mechanical force is applied to the protective plate from outside, the force is distributed to the two optically transparent layers and the optically transparent plate, so that the force applied to the display panel can be dispersed. Also, by forming grooves, which comprise fine concavities and convexities extending in different directions, on surfaces of the optically transparent plate toward the protective plate and toward the display panel, it becomes easy to remove bubbles remaining between the optically transparent layer and the optically transparent plate and since projections on the optically transparent plate function as ribs, it is possible to restrict a direction of deflection of the optically transparent plate in at least two directions to restrict a force applied to the display panel in the case where a mechanical force is applied from outside.

Also, a display device comprises a display panel, a transparent protective plate arranged on a front surface side of the display panel, and an optically transparent layer between the display panel and the protective plate, wherein the display panel comprises a liquid crystal display panel, the liquid crystal display panel comprises a liquid crystal cell and a backlight, and another optically transparent layer substantially the same as the optically transparent layer is arranged between the liquid crystal cell and the backlight.

In this case, since the liquid crystal cell is sandwiched between the two optically transparent layers, the liquid crystal cell is inhibited from warping due to changes in environmental temperature, from being disordered in display, and from being deformed mechanically even in the case where the optically transparent layers are different in coefficient of thermal expansion from the liquid crystal cell.

In particular, when a side light system is used for the backlight and a transparent body used for a light guide plate therefor and a transparent body used for the protective plate are made of the same material, or a material having equivalent coefficients of thermal expansion, the display device becomes structured to be substantially symmetric with the liquid crystal cell centered, so that even in the case where the respective constituent elements are different in coefficient of thermal expansion from one another, display is prevented from being disordered and from being deformed mechanically due to warping of the liquid crystal cell.

Also, an appliance provided with a display device, which comprises a display panel, a transparent protective plate arranged on a front surface side of the display panel, and an optically transparent layer between the display panel and the protective plate, wherein the protective plate is larger in area than the display panel, the display panel is bonded to the protective plate by the optically transparent layer, and the protective plate is fixed to a housing to thereby fix the display device to the appliance.

In this case, a mechanical force applied to the display device from outside is applied to the protective plate and the housing of the appliance and a force applied to the display panel can be restricted, so that any inconvenience is hard to be generated in display.

Other measures than those described above will be made apparent in the following descriptions.

The invention can realize a display device, which comprises a protective plate arranged on a front surface of a display panel and an optically transparent layer between the protective plate and the display panel and in which entrained bubbles are little and display of high quality is obtained. Also, it is possible to provide a display device, in which inconvenience is hard to generate even when a mechanical force is applied from outside.

Other objects, features, and advantages of the invention will be made apparent from descriptions for embodiments of the invention with reference to the drawings.

DESCRIPTION OF THE INVENTION

Embodiments of the invention will be described hereinafter with reference to the drawings.

Figure 1:
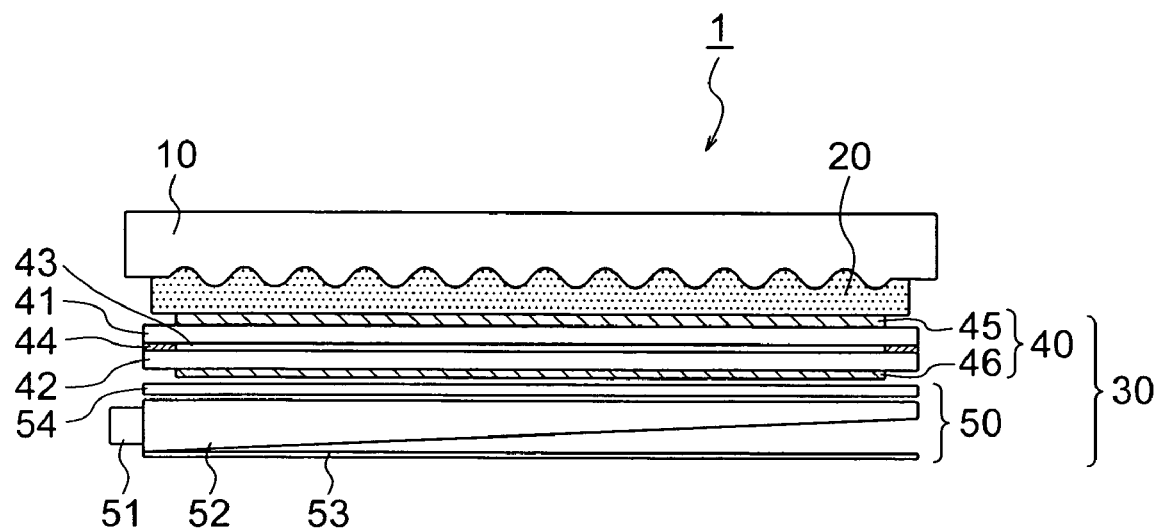
FIG. 1 is a schematic view showing outline of a cross sectional structure of a display device of the invention.

FIG. 1 is a schematic view showing outline of a cross sectional structure of an embodiment of a display device of the invention. The display device 1 comprises a display panel 30, a protective plate 10 arranged on a front surface of the display panel, and an optically transparent layer 20 filled between the protective plate 10 and the display panel 30.

Liquid crystal display panels, organic electroluminescence panels, etc. can be used as the display panel 30. Also, these display panels are of a passive drive type and of an active matrix drive type, but of which detailed structures and operations thereof are well known and therefore an explanation therefor is omitted herein.

The embodiment will be described with respect to the case where a liquid crystal display panel is used for the display panel 30 but the invention is not limited thereto.

The liquid crystal display panel 30 comprises a liquid crystal cell 40 and a backlight 50 arranged on a back surface thereof.

The backlight 50 illuminates a display region of the liquid crystal cell 40 from a back surface side thereof. The backlight 50 is of an edge light type (light guide body type), a direct type (reflector type), a sheet light source type, etc. For the backlight 50, it suffices to select an optimum type among these types and other types according to application, purpose, and a magnitude of a display region. Here, an explanation will be given to a backlight of edge light type.

The backlight 50 comprises a light guide plate 52 made of a transparent resin and formed on a back surface thereof with means, such as dot printing with white pigment, or fine concavity and convexity configurations, lens configurations, etc., which changes a light traveling direction, a light source 51 arranged on an end surface of the light guide plate 52, a reflection sheet 53 arranged on a back surface side of the light guide plate 52, and an optical member 54, such as prism sheet, micro lens array, diffusing sheet, etc., arranged on a front surface side of the light guide plate 52.

It is possible to use a line light source such as cold cathode fluorescent lamp, hot cathode fluorescent lamp, etc., and a point light source such as light emitting diode (LED), etc. for the light source 51. While an explanation will be given herein to the case where LED is used for the light source 51, the invention is not limited thereto.

In the case where LED is used for the light source 51, it is preferred that in order to have light from the light source efficiently incident on the light guide plate 52, a reflection body (not shown) be provided and a configuration of mold resin formed around a light emitting portion be contrived.

With such construction, light outgoing from the light source 51 to be incident on the light guide plate 52 propagates in the light guide plate 52 while making total reflection. That light, out of light propagating in the light guide plate 52, which reaches means applied to a back surface of the light guide body to change a light traveling direction, is changed in its traveling direction to outgo from the front surface side of the light guide plate 52. Light outgoing from the light guide plate 52 is regulated in distribution of outgoing angle and in-plane luminance distribution by the optical member such as prism sheet, micro lens array, diffusing sheet, etc., and then irradiated on the liquid crystal cell 40.

For the liquid crystal cell 40, a transmission type or a transflective type liquid crystal cell is used, which regulates a transmitted light volume from the backlight 50 to display a projected image.

The liquid crystal cell 40 is desirably one, which comprises a polarizing film to control a polarized state of light incident on a liquid crystal layer to display a projected image, since a projected image-having a high contrast ratio can be obtained at a relatively low drive voltage.

For the liquid crystal cell 40, it is possible to use, for example, TN (Twisted Nematic) type, STN (Super Twisted Nematic) type, ECB (Electrical Controlled Birefringence) type, etc. Also, it is possible to use IPS (In Plane Switching) type, which has a feature in wide viewing angle, VA (Vertical Aligned) type.

Alternatively, for the liquid crystal cell 40, it is possible to use a transflective type liquid crystal cell, to which the type described above is applied.

Here, an explanation will be schematically given herein to the outline in the case where an active matrix type is used for the liquid crystal cell 40 but the invention is not limited thereto.

The liquid crystal cell 40 comprises a transparent substrate 41 and a transparent substrate 42, which are made of flat, transparent, and optically isotropic glass, or plastics. A color filter and an alignment layer made of polyimide polymer, both of which are not shown, are laminated on the transparent substrate 41. The transparent substrate 42 is formed with an alignment layer, an electrode, which forms pixels, a signal electrode, switching elements formed from thin film transistors, etc. all of which are not shown.

A frame-shaped sealing material 44 is bonded to peripheries of the two transparent substrates 41, 42 to define a space therein in a state, in which alignment layer forming surfaces of the transparent substrates face each other and a predetermined clearance is provided by a spacer (not shown). A liquid crystal layer 43 is provided by charging a liquid crystal into the space to seal the same.

A direction, in which major axes of liquid crystal molecules of the liquid crystal layer 43 are aligned, is defined by an alignment processing, which is applied to the alignment layers formed on the two transparent substrates 41, 42.

A polarizing film 45 and a polarizing film 46, respectively, are provided on a front surface of the transparent substrate 41 and a back surface of the transparent substrate 42.

A polarizing film transmits therethrough one of linearly polarized light components, which are perpendicular to each other, out of light incident thereon and absorbs the other. For the polarizing films 45, 46, a structure can be used, in which two protective films made of triacetylcellulose film interpose therebetween a polarizing layer expressing absorption dichroism by drawing a base material film made of polyvinylalcohol or the like and having a dichroic material such as iodic, organic dye, etc. dyed or adsorbed thereto and aligning the dichroic material.

The polarizing films 45, 46, respectively, are fixed to the transparent substrates 41, 42 through adhesive layers (not shown).

The optically transparent layer 20 is decreased in reflection on boundary surfaces with the polarizing film 45 on the front surface of the display panel 30 and the protective plate 10 as the refractive index thereof is close in value to those of the polarizing film and the protective plate. That is, in order to lessen unnecessary reflection, it is required that a difference in refractive index between the optically transparent layer, and the polarizing film and the protective plate be small.

Specifically, since triacetylcellulose film made use of as protective layers for the polarizing films and a material used as a protective plate described later have refractive indexes in the order of 1.4 to 1.6, unnecessary reflection on the respective interfaces can be adequately suppressed by putting the refractive index of the optically transparent layer in the range of 1.4 to 1.6.

For example, the following materials can be listed as the optically transparent layer.

There can be listed thermosetting resins, which are polymerized by thermosetting and photo-curing monomer, photoresist, or thermoplastic resins, of which curing is completed.

A method of charging the optically transparent layer 20 between the protective plate 10 and the display panel 30 includes one, in which a bank (not shown) is provided on a peripheral portion of a member (the protective plate, or the liquid crystal cell), with which the optically transparent layer 20 is brought into contact, in response to need, monomers of a thermosetting resin and of photoresist as the optically transparent layer 20 are filled into a clearance between the protective plate 10 and the display panel 30 and then cured by application of appropriate heat or light. Monomers of these resins include one, which is polymerized by the use of double coupling in monomers, one, which is polymerized by dehydration reaction, dealcoholization reaction, etc.

Monomers polymerized by the use of double coupling in monomers include styrene, methylmethacrylate, ethyl methacrylate, propyl methacrylate, isopropyl methacrylate, butyl methacrylate, isobutyl methacrylate, hexylmethacrylate, methyl acrylate, ethyl acrylate, propyl acrylate, isopropyl acrylate, butyl acrylate, isobutyl acrylate, etc. These are used singly or in plural to form the optically transparent layer. Monomers polymerized by dehydration reaction include ones, in which monomer having at distal ends two or more hydroxyls, or glycidyl group, two or more amino groups and monomer having at distal ends two or more carboxyl groups, or carboxylic acid anhydrate structures make condensation polymerization. Monomers having hydroxyls at distal ends include ethylene glycol, propylene glycol, diethylene glycol, 1,3-dihydroxylcyclobutane, 1,4-dihydroxylcyclohexane, 1,5-dihydroxylcyclooctane, etc., and monomers having glycidyl groups at distal ends include ethylene glycol monoglycidyl ether, ethylene glycol diglycidyl ether, etc. Monomers having amino groups at distal ends include ethylene diamine, 1,4-diaminobutane, 1,6-diaminohexane, 1,4-diaminobenzene, 2,6-diaminonaphthalene, melamine, etc. Monomers having carboxyl groups at distal ends include adipic acid, 1,3-phthlic acid, fumaric acid, maleic acid, trimellitic acid, pyromellitic acid, etc. Monomers having carboxylic acid anhydrate structures at distal ends include anhydrous maleic acid, anhydrous phthlic acid, anhydrous pyromellitic acid, etc. Monomers polymerized by dehydration reaction include a compound having an alkoxysilane group and a compound having an alkoxytitanium group. Specifically, there are included tetramethoxysilane, tetraethoxysilane, tetrapropoxysilane, tetrabutoxysilane, methyltrimethoxysilane, ethoxytrimethoxysilane, butyltrimethoxysilane, methyltriethoxysilane, ethyltriethoxysilane, butyltriethoxysilane, 1-aminopropyltriethoxysilane, 1-chloropropyltriethoxysilane, 1-glycidylpropyltriethoxysilane, etc.

Also, by using a material, such as polyisobutylene, having a high elasticity, the optically transparent layer can be improved in buffer action on shocks. The optically transparent layer 20 preferably has a hardness of 5 to 40 according to Standard JIS K 6253 for measurement of rubber hardness. In case of a hardness less than 5, there is a fear that reliability is decreased when the optically transparent layer 20 is to be held over a long term, and in case of exceeding the hardness of 40, there is a tendency of a decrease in buffer effect on shocks.

Also, polystyrene, styrene/acrylic resin, acrylic resin, polyester resin, polypropylene, polyisobutylene, etc. are listed as thermoplastic resins. These substances are heated up to Tg or higher whereby they can be liquefied and charged.

In addition, the embodiment does not except the case where the optically transparent layer is liquid. In this case, the optically transparent layer can be charged in the following method. First, a bank (not shown) is provided on a periphery of a member (the protective plate, or the liquid crystal cell), with which the optically transparent layer is brought into contact, a liquid optically transparent layer composition is then injected, and in case of bubbles being produced, bubbles are removed by carrying out application of pressure, or application of pressure and heating in a device such as autoclave, etc., applying vibrations by means of a vibrator, etc., sucking, or the like. In the case where the optically transparent layer is liquid, it is possible to use, for example, alcohol (carbon number of at least 6), diol (ethylene glycol, propylene glycol, etc.), hydrocarbon (carbon number of at least 10), monoalkyl ether of ethylene glycol, monoalkyl ester of ethylene glycol, monoalkyl ether of diethylene glycol, monoalkyl ester of diethylene glycol, monoalkyl ether of triethylene glycol, monoalkyl ester of triethylene glycol, etc.

In case of being liquid, the optically transparent layer desirably has a thickness of at least 0.1 mm in order to ensure accuracy at the time of forming a bank, or make release of bubbles easy. Also, when being too thick, especially in case of a liquid, it becomes difficult for a bank to hold a liquid since the liquid is increased in weight.

In this manner, when the optically transparent layer is charged in a state of being liquid, complexity is involved in process and structure. Therefore, it is desirable to apply a sheet-shaped material for the optically transparent layer instead of a liquid material since it is favorable in ease of handling and quality of working. In this case, it suffices to use a so-called transparent elastomer for the sheet-shaped optically transparent layer and it is desired in terms of ease of handling that its elasticity be $1 \times 10^5$ to $3 \times 10^5$ Pa and its thickness be 0.1 mm to 1 mm.

The optically transparent layer 20 is arranged in a manner to cover at least all the display region (screen) of the display panel 30.

A transparent plate almost free of absorption in visible wavelength range can be used for the protective plate 10. Specifically, it is possible to use a plate made of a transparent resin such as acrylic, polycarbonate, etc. and a glass plate.

The protective plate 10 is at least larger in area than the display region (screen) of the display panel 30 and arranged so as to cover a larger range than the optically transparent layer 20.

Fine concavity and convexity configurations are formed on a surface of the protective plate 10 on a side of the display panel 30. In this case, bubbles trapped when the protective plate and the optically transparent layer are brought into contact with each other release from clearances between the concavities and convexities formed on the protective plate upon application of pressure, so that it is possible to inhibit bubbles from remaining. That is, since even in case of using a sheet-shaped material for the optically transparent layer 20, bubbles are inhibited from remaining, it is possible to realize a display device, in which reflection of external light is little and an image of high quality is obtained even in a bright environment.

In addition, in case of forming fine concavity and convexity configurations on the protective plate 10, the optically transparent layer 20 is beforehand brought into close contact with the display panel 30. At this time, in case of using a sheet-shaped material for the optically transparent layer 20, it is easy to bring the material into close contact with the display panel 30 without residue of bubbles provided that the sheet-shaped optically transparent layer has the elasticity in the order of 1 to $3 \times 10^5$ Pa.

While the concavities and convexities formed on the protective plate 10 may have a cross sectional shape of triangular waves or rectangular waves, they are desirably wave-shaped without corners as illustrated in FIG. 1 in order to bring the optically transparent layer 20 easily into close contact with the protective plate 10. Also, while heights of the concavities and convexities formed on the protective plate 10 are different in optimum value in dependent on the elasticity of the optically transparent layer 20, at least 1 μm is preferable from the viewpoint of preventing bubbles from remaining and at most 25 μm is desirable from the viewpoint of stability after close contact.

Also, the concavity and convexity configurations desirably have a pitch ½ or more than heights of the concavities and convexities, more desirably twice or more in order to bring the optically transparent layer 20 easily into close contact with the protective plate 10 without clearances. The reason for this is that in the case where the concavity and convexity configurations have a pitch ½ or less than heights of the concavity and convexity configurations, the optically transparent layer becomes hard to come into close contact with the recesses of the protective plate 10 and bubbles become easy to remain especially in the case where a sheet-shaped optically transparent material is used for the optically transparent layer 20.

Also, by making the concavities and convexities formed on the protective plate groove-shaped, it is possible to decrease deflection in the case where a mechanical force is applied to the protective plate from outside. That is, since projections formed on the protective plate function also as ribs, it is possible to restrict a force applied to the display panel in the case where a mechanical force is applied from outside.

FIGS. 2, 3, 4, and 5, respectively, are front views schematically showing examples of grooves in the case where concavity and convexity configurations formed on a surface of the protective plate 10 on a side of the display panel are groove-shaped.

Figure 2:
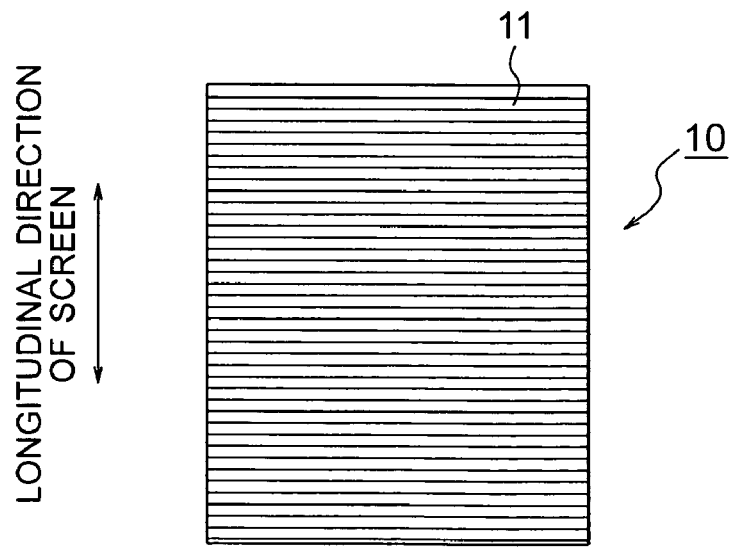
FIG. 2 is a front view schematically showing a groove-shaped structure of a protective plate according to the invention.

FIG. 2 is a front view schematically showing the case where groove-shaped concavity and convexity configurations 11 formed on a surface of the protective plate 10 on a side of the display panel are perpendicular to a longitudinal direction of the screen. In this case, while bubbles trapped when the protective plate 10 and the optically transparent layer 20 are brought into contact with each other release along the grooved configurations formed on the protective plate upon application of pressure, paths for the release become short in distance, and so there is produced an effect that it is easy to inhibit bubbles from remaining.

Figure 3:
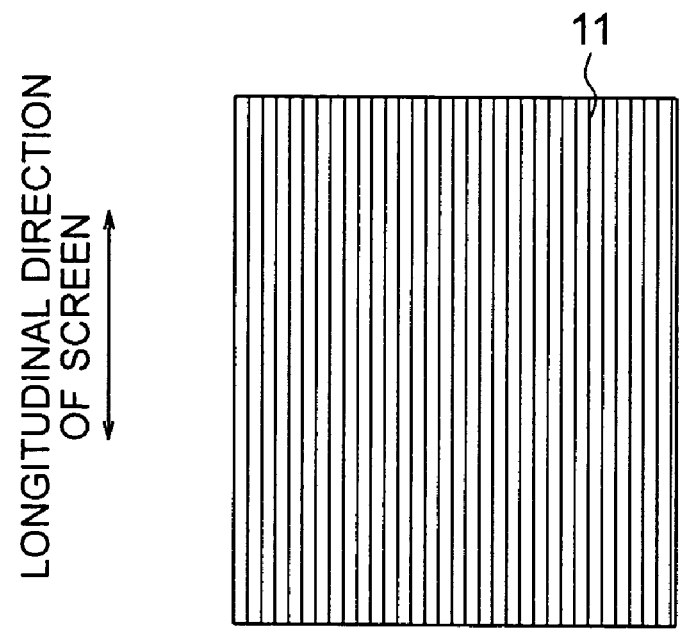
FIG. 3 is a front view schematically showing a groove-shaped structure of a protective plate according to the invention.

FIG. 3 is a front view schematically showing the case where groove-shaped concavity and convexity configurations 11 formed on a surface of the protective plate 10 toward the display panel are in parallel to a longitudinal direction on the screen. In this case, projections formed on the protective plate 10 function also as ribs, and in the case where a mechanical force is applied from outside, deflection of the protective plate 10 becomes smaller than that in the case illustrated in FIG. 2 and there is also produced an effect that it is possible to restrict a force applied to the display panel.

Figure 4:
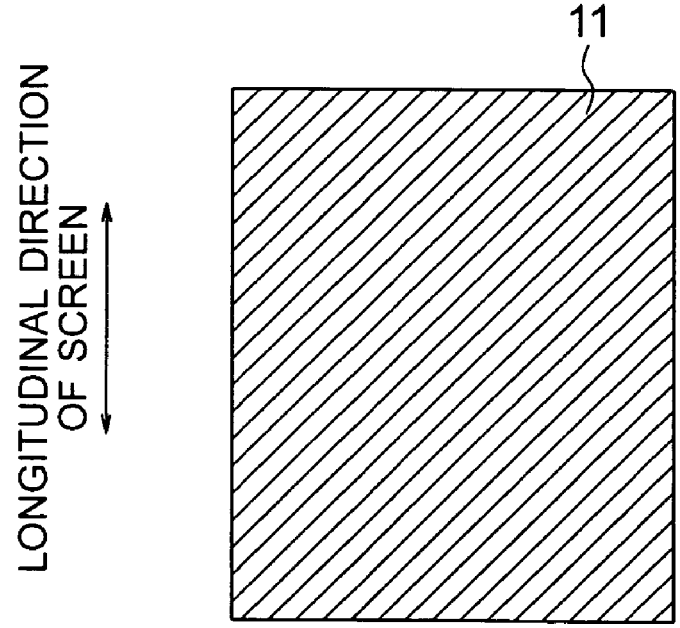
FIG. 4 is a front view schematically showing a groove-shaped structure of a protective plate according to the invention.

FIG. 4 is a front view schematically showing the case where groove-shaped concavity and convexity configurations 11 formed on a surface of the protective plate 10 toward the display panel are in a direction inclined relative to a longitudinal direction on the screen. In this case, since a direction, in which groove-shaped structures formed on the protective plate 10 are repeated, is different from that, in which pixels of the display panel 30 are aligned, there is produced an effect that moire generated between the groove-shaped structures formed on the protective plate 10 and aligned pixels of the display panel 30 is suppressed.

Figure 5:
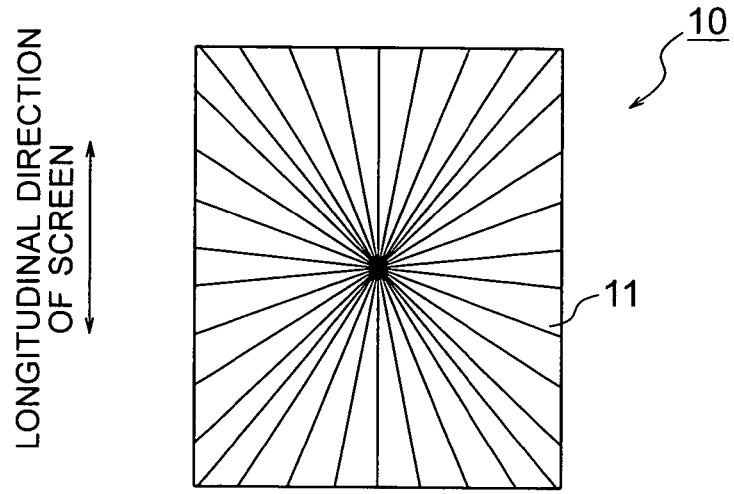
FIG. 5 is a front view schematically showing a groove-shaped structure of a protective plate according to the invention.

FIG. 5 is a front view schematically showing the case where groove-shaped concavity and convexity configurations 11 formed on a side of the protective plate 10 toward the display panel are shaped to extend radially outwardly from a center thereof. In this case, since a direction, in which groove-shaped structures formed on the protective plate 10 are repeated, is different from that, in which pixels of the display panel 30 are aligned, there is produced an effect that moire generated between the groove-shaped structures formed on the protective plate 10 and aligned pixels of the display panel 30 is suppressed. Also, projections function also as ribs, and in the case where a mechanical force is applied from outside, deflection of the protective plate 10 becomes smaller and there is produced an effect that it is possible to restrict a force applied to the display panel.

In any case, for the concavity and convexity configurations formed on a surface of the protective plate 10 toward the display panel, it suffices to select an optimum shape in dependent on the elasticity and thickness of the optically transparent layer 20, definition of the display panel, and use of a display device.

Figure 6:
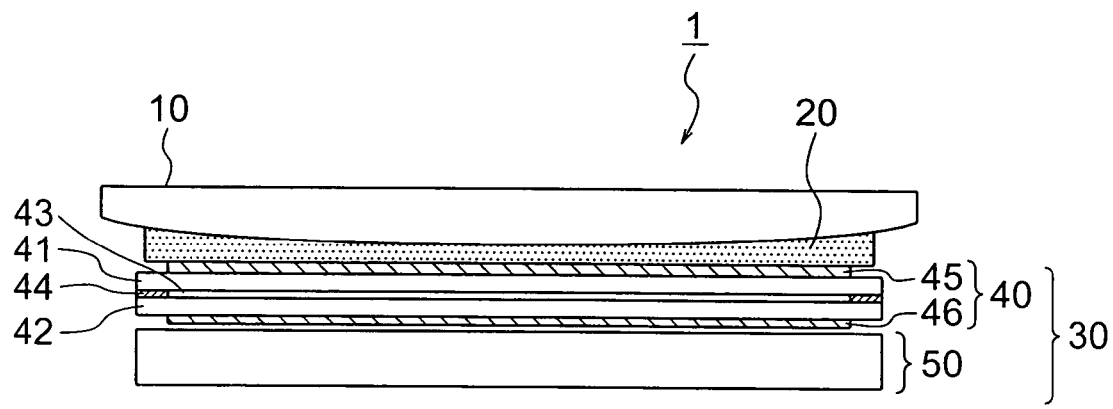
FIG. 6 is a schematic view showing outline of a cross sectional structure of a display device according to the invention.

Subsequently, an explanation will be given to another embodiment of a display device of the invention. FIG. 6 is a cross sectional view schematically showing outline of a construction of an embodiment of a display device of the invention. The display device 1 comprises a display panel 30, a protective plate 10 arranged on a front surface of the display panel, and an optically transparent layer 20 filled between the protective plate 10 and the display panel 30, the same members as those in the embodiment described above are denoted by the same reference numerals as those in the latter, and a detailed explanation therefor is omitted.

In particular, the embodiment has a feature in that at least a center and/or neighborhood of the center of a surface of the protective plate 10 toward the display panel 30 is bulged from a periphery thereof.

In this case, when the protective plate 10 is caused to overlap the optically transparent layer 20, the protective plate 10 and the optically transparent layer 20 begin to come into contact with each other at central portions and neighborhoods thereof and bubbles are pushed out toward peripheral portions thereof upon application of pressure, so that it is possible to inhibit bubbles from remaining. In addition, in this case, like the embodiment described above, in which fine concavity and convexity configurations are formed on the protective plate 10, the optically transparent layer 20 is beforehand brought into close contact with the display panel 30. At this time, in the case where a sheet-shaped material is used for the optically transparent layer 20, it can be easily brought into close contact with the display panel 30 without residue of bubbles provided that the sheet-shaped optically material has an elasticity in the order of 1 to $3 \times 10^5$ Pa.

Figure 7:
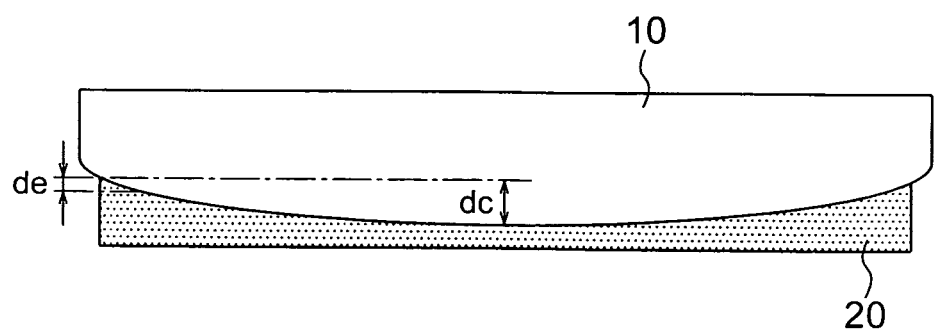
FIG. 7 is a schematic view illustrating the definition of a bulging amount of a protective plate, according to the invention, on a side of a display panel.

FIG. 7 is a view schematically showing the definition of a bulging amount dc of the protective plate 10 toward the display panel 30. The bulging amount dc of the protective plate 10 toward the display panel 30 means a relative thickness with a position of an outermost end, in which the optically transparent layer 20 is in close contact with the protective plate 10, as reference. Also, a relative thickness at an end of a display region (screen) of the display panel 30 with a position of an outermost end, in which the optically transparent layer 20 is in close contact with the protective plate 10 likewise, as reference is defined as a bulging amount de at the end of the protective plate.

According to the embodiment, the relationship dc>de stands between a bulging amount dc of the protective plate and a bulging amount de at the end of the protective plate.

In addition, it is desirable that a bulging amount dc of the protective plate 10 toward the display panel 30 be smaller than an initial thickness when the optically transparent layer 20 is arranged on the display panel 30. The reason for this is that in the case where a bulging amount dc of the protective plate 10 is larger than an initial thickness of the optically transparent layer 20, the optically transparent layer 20 is elastically deformed when pressure is applied in order to bring the protective plate 10 and the optically transparent layer 20 into close contact with each other, but the protective plate 10 and the optically transparent layer 20 become liable to peel off in the periphery of the protective plate 10 when pressure is removed.

Also in this embodiment, like the embodiment described above, even when a sheet-shaped material is used for the optically transparent layer 20, bubbles are inhibited from remaining, so that it is possible to realize a display device, in which reflection of external light is little and an image of high quality is obtained even in a bright environment.

In addition, in order to make release of bubbles easy, it is effective to improve wettability of a surface of the protective plate 10 toward the display panel, and of a surface, with which the optically transparent layer being a front surface of the display panel 30 comes into contact. Since the optically transparent layer becomes liable to adhere when a surface thereof is improved in wettability, bubbles become consequently liable to release. Taking into consideration specific conditions for wettability with water as reference, a contact angle with water is preferably at most 20°, more desirably at most 10°.

Figure 8:
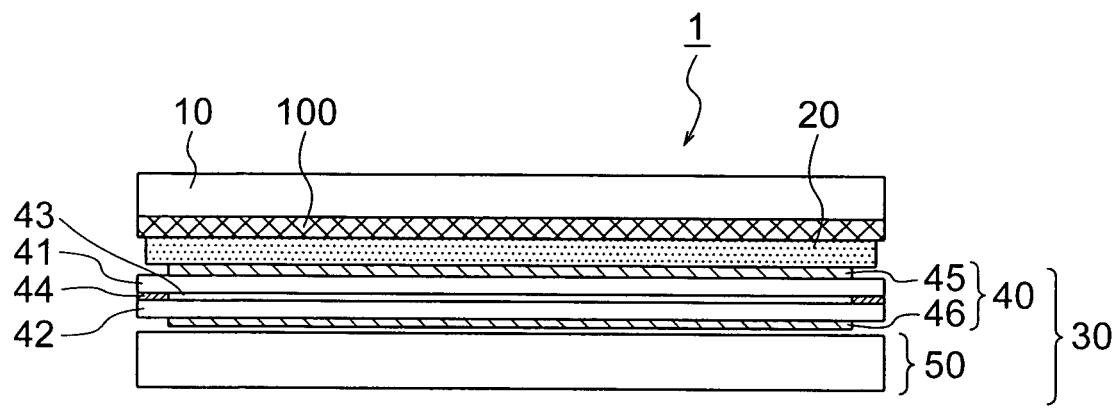
FIG. 8 is a schematic view showing outline of a cross sectional structure of a display device according to the invention.

Subsequently, an explanation will be given to other embodiment of a display device of the invention. FIG. 8 is a cross sectional view schematically showing outline of a structure of an embodiment of a display device of the invention. The display device 1 comprises a display panel 30, a protective plate 10 arranged on a front surface of the display panel, and an optically transparent layer 20 filled between the protective plate 10 and the display panel 30, the same members as those in the embodiments described above are denoted by the same reference numerals, and a detailed explanation therefor is omitted.

The embodiment has a feature in that a transparent nano pore layer 100 including voids having a magnitude of several nano to several tens of nano is provided on at least a surface of the protective plate 10 toward the display panel 30.

The transparent nano pore layer 100 can be formed from an inorganic oxide. In particular, in order to prevent unnecessary reflection, it is desired that the layer be formed from silicon oxide having a relatively low refractive index, or a silicon compound having a hydrolyzable group among inorganic oxides.

The transparent nano pore layer having silicon oxide as a main component can be formed in the following process. First, fine particles of silicon oxide and silica sol are dispersed and dissolved in water, or an alcohol solvent. A mixture of these substances is coated on the protective plate 10 and then rapidly heated whereby the solvent is rapidly vaporized to generate bubbles in the film. When solidification is terminated in this state, a transparent nano pore layer including voids having a magnitude of several nano to several tens of nano can be formed in the layer.

In this case, bubbles trapped when the protective plate 10 and the optically transparent layer 20 are brought into contact with each other are dispersed in the transparent nano pore layer 100 upon application of pressure, and a part of the bubbles is discharged through the transparent nano pore layer and a part of the bubbles becomes bubbles smaller than a wavelength of light to be invisible.

In addition, in this case, like the embodiments described above, the optically transparent layer 20 is beforehand brought into close contact with the display panel 30. At this time, in the case where a sheet-shaped material is used for the optically transparent layer 20, it is easy to bring the same into close contact with the display panel 30 without residue of bubbles provided that the sheet-shaped optically material has an elasticity in the order of 1 to $3 \times 10^5$ Pa.

In addition, in the case where fine particles of silicon oxide forming the transparent nano pore layer is spherical-shaped, it desirably has an average particle size of 190 nm or less so that visible light (having a wavelength of 380 to 760 nm) incident on the film does not scatter. With a larger average particle size than the above, incident light scatters, so that the film looks sometimes cloudy to be inconvenient in application connected to display. Also, in the case where fine particles of silicon oxide is a chain one, it is desirably necessary to have a thickness of 190 nm or less for the same reason as that described above.

Figure 9:
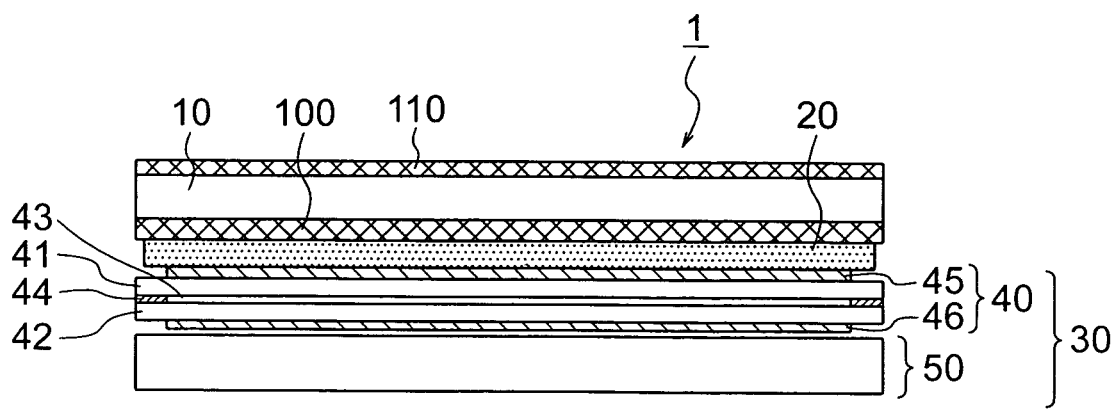
FIG. 9 is a schematic view showing outline of a cross sectional structure of a display device according to the invention.

In addition, since the transparent nano pore layer 100 can be decreased in refractive index, it functions as a monolayer antireflection film when being optimized in thickness. In this case, the transparent nano pore layer may be formed also on a front surface of the protective plate. FIG. 9 is a cross sectional view schematically showing outline of a structure of an embodiment of such display device of the invention. The display device 1 comprises a display panel 30, a protective plate 10 arranged on a front surface of the display panel, and an optically transparent layer 20 filled between the protective plate 10 and the display panel 30, and the same members as those in the embodiments described above are denoted by the same reference numerals, and a detailed explanation therefor is omitted. The display device 1 has a feature in that transparent nano pore layers 110, 100 are especially provided on a front side of and a surface of the protective plate 10 toward the display panel 30.

A method of forming transparent nano pore layers on the both surfaces of the protective plate 10 in this manner includes dip coating, flow coating, etc.

In the case where the transparent nano pore layers function as antireflection jointly, it suffices that their thickness be in the order of 60 to 190 nm. In this case, the transparent nano pore layer 110 is effective in discharging bubbles trapped when the protective plate 10 and the optically transparent layer 20 are brought into contact with each other, or making it hard to visually recognize the bubbles, and the transparent nano pore layer 100 is effective in preventing reflection at a boundary surface of the protective plate 10 with an air on a front side thereof. Therefore, it is possible to realize a display device, in which reflection of external light is little and an image of high quality is obtained even in a bright environment.

Subsequently, an explanation will be given to another embodiment of a display device of the invention. The embodiment has a feature in that an optically transparent layer is thinner at ends thereof than a central portion thereof in the display device comprising a display panel, a protective plate arranged on a front surface of the display panel, and the optically transparent layer filled between the display panel and the protective plate.

FIGS. 10, 11, 12, and 13, respectively, are cross sectional views schematically showing outline of structures of embodiments of a display device of the invention. The display device 1 according to the embodiments comprises a display panel 30, a protective plate 10 arranged on a front surface of the display panel, and an optically transparent layer 20 filled between the protective plate 10 and the display panel 30, and the same members as those in the embodiments described above are denoted by the same reference numerals, and a detailed explanation therefor is omitted.

Here, an end of the optically transparent layer 20 is present in a position corresponding to a display region (screen) of the display panel 30, and indicates a portion, in which its thickness te (te1+te2 in FIG. 13) is smaller than a thickness tc in a position corresponding to the display region (screen) of the display panel 30 of the optically transparent layer 20.

Figure 10:
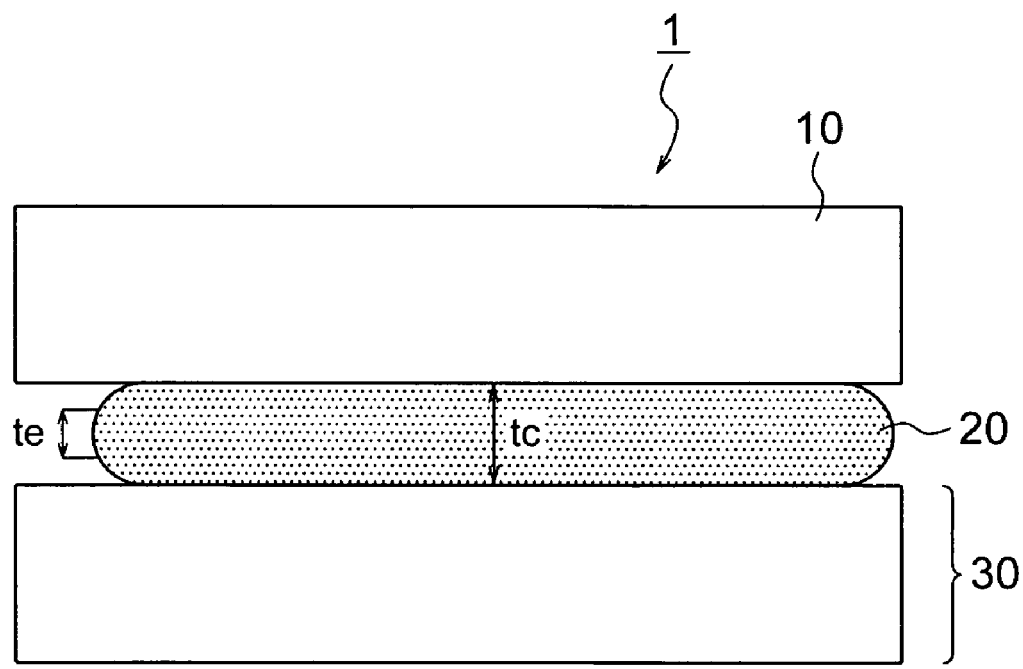
FIG. 10 is a cross sectional view schematically showing outline of a construction of an embodiment of a display device according to the invention.

FIG. 10 is a cross sectional view schematically showing the case where the end of the optically transparent layer 20 is shaped to bulge outward in a substantially semi-spherical manner, so that the thickness te of the end of the optically transparent layer is thinner than the thickness tc of the central portion. In this case, even when a polarizing film is provided on a surface of the display panel 30 and burr is present at end surfaces thereof, generation of bubbles attributable to burr at end surfaces of the polarizing film is suppressed since the end of the optically transparent layer is thin and arranged in a position corresponding to the ends of the polarizing film. Also, in the case where the optically transparent layer is larger in coefficient of thermal expansion than the display panel and environmental temperature is low, the optically transparent layer shrinks larger than the display panel but the optically transparent layer is liable to absorb dimensional changes caused by temperature drop since the end of the optically transparent layer bulges outward in a substantially semispherical manner.

Figure 11:
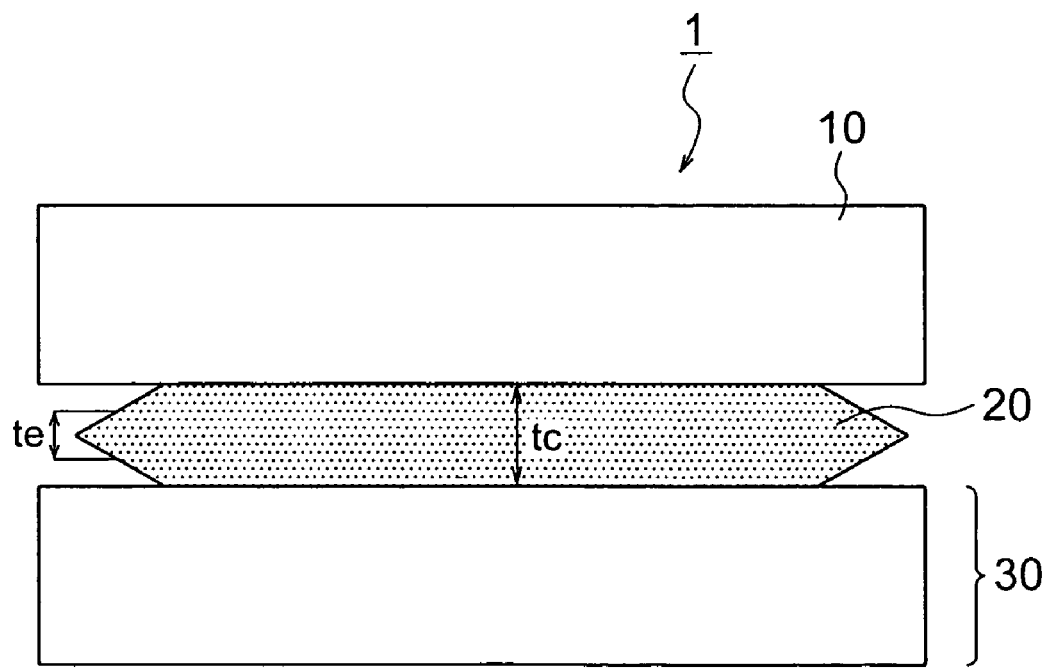
FIG. 11 is a cross sectional view schematically showing outline of a construction of an embodiment of a display device according to the invention.

FIG. 11 is a cross sectional view schematically showing the case where an end of an optically transparent layer 20 is shaped to bulge outward in a substantially triangular prism, so that a thickness te of the end of the optically transparent layer is thinner than a thickness tc of a central portion thereof. Also in this case, even when a polarizing film is provided on a surface of a display panel 30 and burr is present at end surfaces thereof, generation of bubbles attributable to burr at end surfaces of the polarizing film is suppressed since the end of the optically transparent layer is thin and arranged in a position corresponding to the ends of the polarizing film. Also, in the case where the optically transparent layer is larger in coefficient of thermal expansion than the display panel and environmental temperature is low, the optically transparent layer shrinks larger than the display panel but the optically transparent layer is liable to absorb dimensional changes caused by temperature drop since the end of the optically transparent layer bulges outward.

Figure 12:
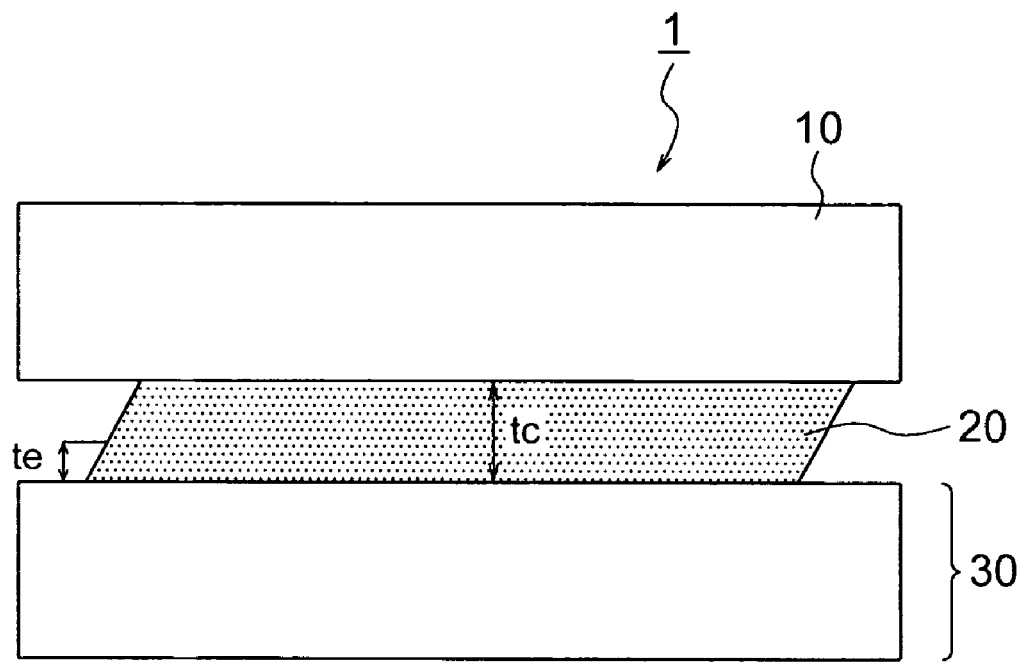
FIG. 12 is a cross sectional view schematically showing outline of a construction of an embodiment of a display device according to the invention.

FIG. 12 is a cross sectional view schematically showing the case where an end of an optically transparent layer 20 is cut obliquely, so that a thickness te of the end is made thinner than a thickness tc of a central portion thereof. Also in this case, even when a polarizing film is provided on a surface of a display panel 30 and burr is present at end surfaces thereof, generation of bubbles attributable to burr at end surfaces of the polarizing film is suppressed since the end of the optically transparent layer is thin and arranged in a position corresponding to the ends of the polarizing film.

Figure 13:
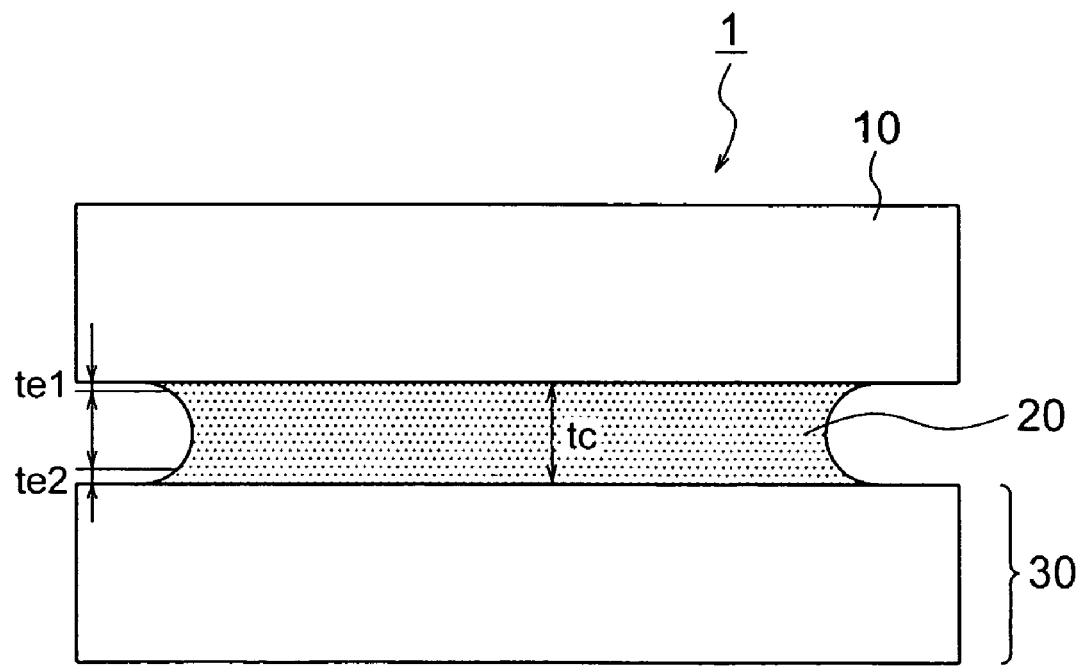
FIG. 13 is a cross sectional view schematically showing outline of a construction of an embodiment of a display device according to the invention.

FIG. 13 is a cross sectional view schematically showing the case where an end of an optically transparent layer 20 is shaped to be concave inwardly, so that a thickness (te1+te2) of the end of the optically transparent layer is made thinner than a thickness tc of a central portion thereof. Also in this case, even when a polarizing film is provided on a surface of a display panel 30 and burr is present at end surfaces thereof, generation of bubbles attributable to burr at end surfaces of the polarizing film is suppressed since the end of the optically transparent layer is thin and arranged in a position corresponding to the ends of the polarizing film. Also, in the case where the optically transparent layer is larger in coefficient of thermal expansion than the display panel and environmental temperature is high, the optically transparent layer expands larger than the display panel but the optically transparent layer is liable to absorb dimensional changes caused by temperature rise since the end of the optically transparent layer is concave inwardly.

In any case, it suffices that an optimum shape be selected for the end of the optically transparent layer 20 according to the elasticity and thickness of the optically transparent layer 20, a state of a surface of the display panel, and an environment, in which the display device is used.

Also, the shape of the end of the optically transparent layer 20 can be changed by an end cutting method in the case where the optically transparent layer is a sheet-shaped material, or by a shape of a bank, by which the optically transparent layer is held, control of wettability of a surface of the protective plate and/or a surface of the display panel for regulation of contact angle in the case where the optically transparent layer is a liquid material.

Subsequently, an explanation will be given to other embodiment of a display device of the invention. In the display device comprising a display panel, a protective plate arranged on a front surface of the display panel, and an optically transparent layer filled between the display panel and the protective plate, it is an object of the embodiment to provide a film sun as a polarizing film on a surface of the display panel and to restrict bubbles generated due to the shape of an end of the film.

Figure 14:
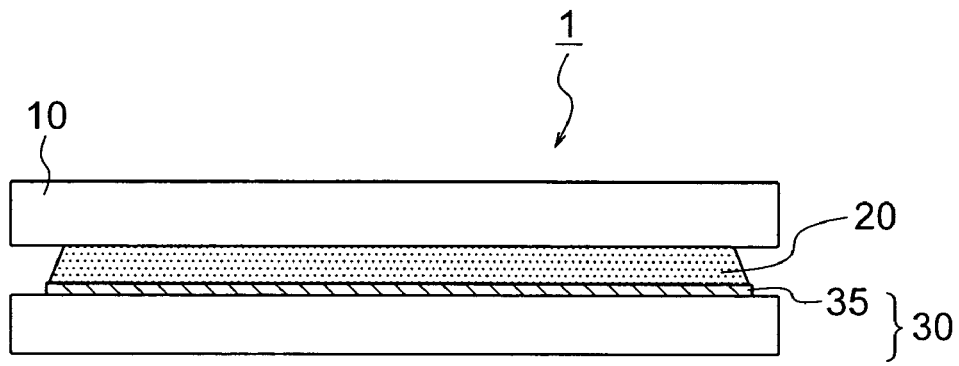
FIG. 14 is a cross sectional view schematically showing outline of a construction of an embodiment of a display device according to the invention.
Figure 15:
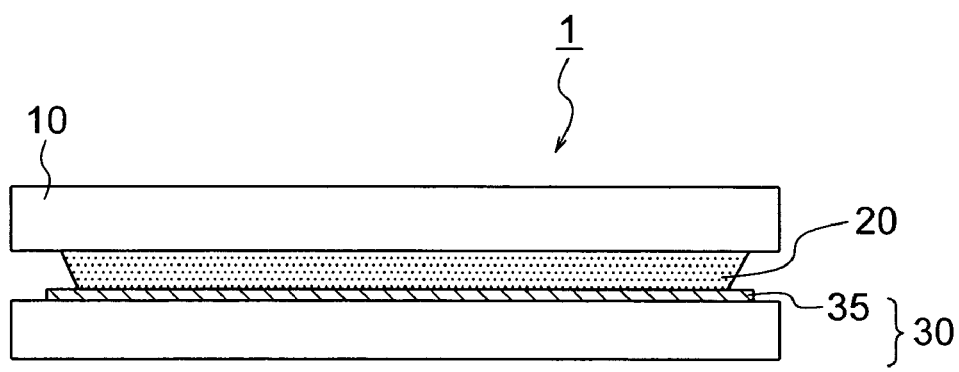
FIG. 15 is a cross sectional view schematically showing outline of a construction of an embodiment of a display device according to the invention.
Figure 16:
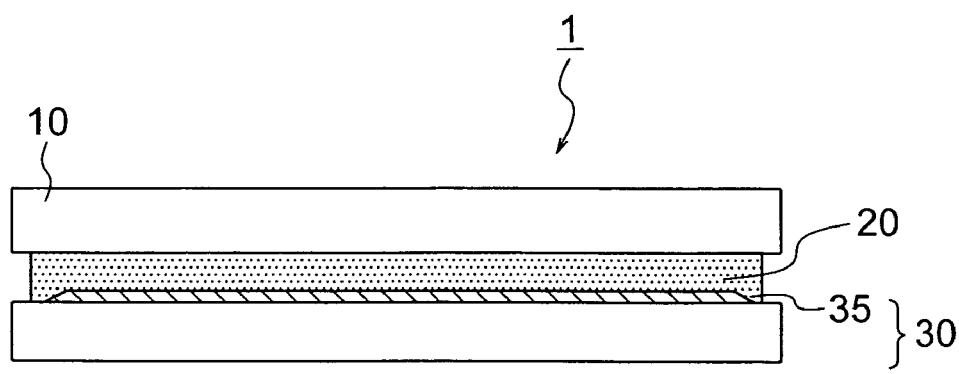
FIG. 16 is a cross sectional view schematically showing outline of a construction of an embodiment of a display device according to the invention.

FIGS. 14, 15 and 16, respectively, are cross sectional views schematically showing outline of structures of embodiments of a display device of the invention. The display device 1 according to the embodiments also comprises a display panel 30, a protective plate 10 arranged on a front surface of the display panel, and an optically transparent layer 20 filled between the protective plate 10 and the display panel 30, and the same members as those in the embodiments described above are denoted by the same reference numerals, and a detailed explanation therefor is omitted.

Liquid crystal display panels and organic electroluminescence display panels can be used as the display panel 30. In case of liquid crystal display panels, a polarizing film is arranged on an outermost surface of the display panel. Also, in case of organic electroluminescence display panels, a circular polarizer is arranged on an outermost surface of the display panel in order to suppress reflection on an electrode. That is, in FIGS. 14, 15 and 16, a film 35 arranged on an outermost surface of the display panel generally comprises a polarizing film.

FIG. 14 is a cross sectional view schematically showing the case where an end of an optically transparent layer 20 is cut obliquely so that the end is made thin in thickness and a surface thereof having a large width is arranged toward the display panel. In this case, even when burr is present at end surfaces of the film 35 on a surface of the display panel 30, generation of bubbles attributable to the burr at the end surfaces of the film 35 is suppressed since the end of the optically transparent layer is thin and arranged in a position corresponding to the ends of the film 35.

FIG. 15 is a cross sectional view schematically showing the case where an end of an optically transparent layer 20 is cut obliquely so that the end is made thin in thickness and a surface thereof having a small width is arranged toward the display panel. In this case, even when burr is present at end surfaces of the film 35 on a surface of the display panel 30, generation of bubbles attributable to the burr at the end surfaces of the film 35 is suppressed since that surface of the end of the optically transparent layer, which is small in width, is directed toward the display panel and the end of the optically transparent layer is arranged so as not to come into contact with the ends of the film 35.

FIG. 16 is a cross sectional view schematically showing the case where end surfaces of the film 35 provided on a surface of the display panel 30 are tapered in shape. In this case, since burr is absent at end surfaces of the film 35 on the surface of the display panel 30, generation of bubbles attributable to the burr at the end surfaces of the film 35 is suppressed.

Subsequently, an explanation will be given to other embodiments of a display device of the invention. In the display device comprising a display panel, a protective plate arranged on a front surface of the display panel, and an optically transparent layer filled between the display panel and the protective plate, it is an object of the embodiments to restrict bubbles generated due to a colored layer provided on the protective plate.

Figure 17:
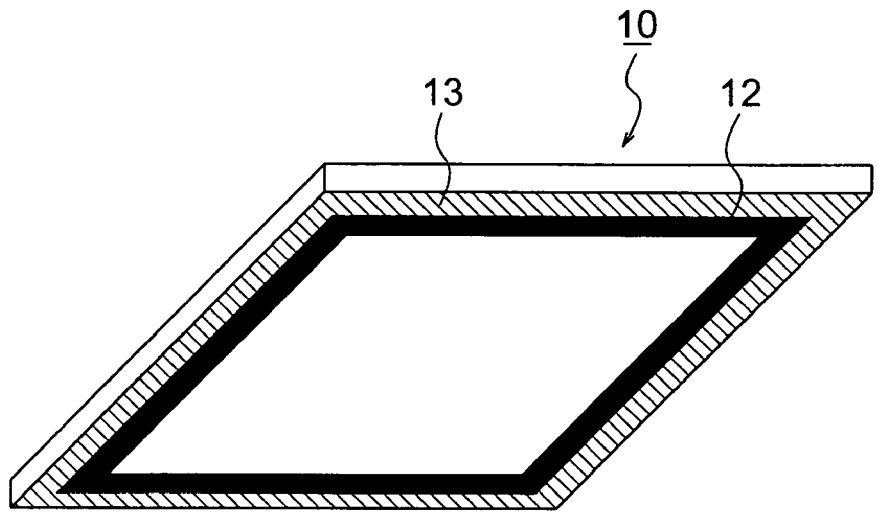
FIG. 17 is a perspective view showing an example of a protective plate according to the invention.

FIG. 17 is a perspective view showing an example of a protective plate 10. In display devices used for portable telephones, a colored layer such as frame, logo, etc. is generally printed on a side of the protective plate 10 toward a display panel. FIG. 17 shows, as an example, a protective plate comprising a first black colored layer 12 formed in a frame on an inner side, and a second bright colored layer 13 formed in a frame on an outer side.

Such colored layers usually have a limited thickness to form a difference in level on a surface of the protective plate. Such difference in level is responsible for causing bubbles to remain when the optically transparent layer and the protective plate are brought into contact with each other.

Figure 18:
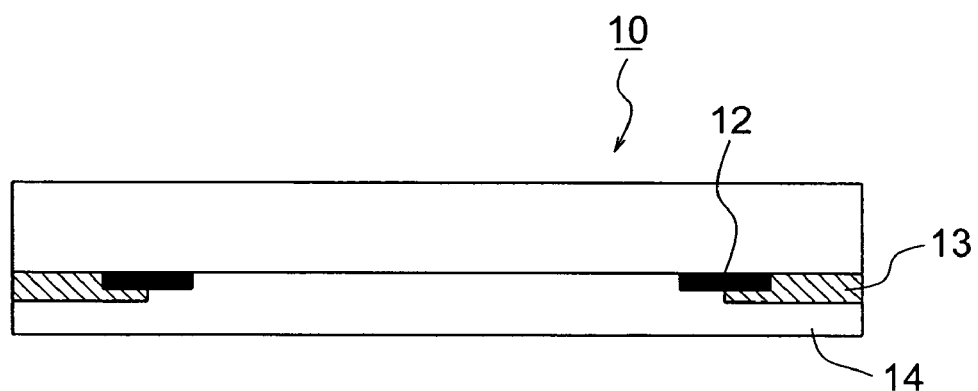
FIG. 18 is a cross sectional view schematically showing outline of a construction of an embodiment of a protective plate of a display device according to the invention.
Figure 19:
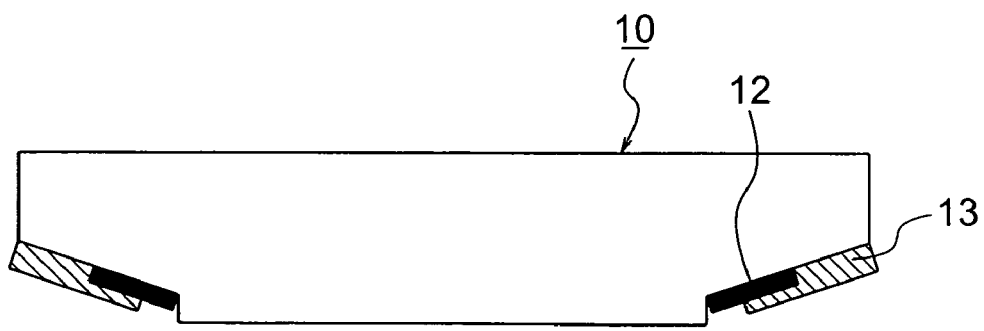
FIG. 19 is a cross sectional view schematically showing outline of a construction of an embodiment of a protective plate of a display device according to the invention.
Figure 20:
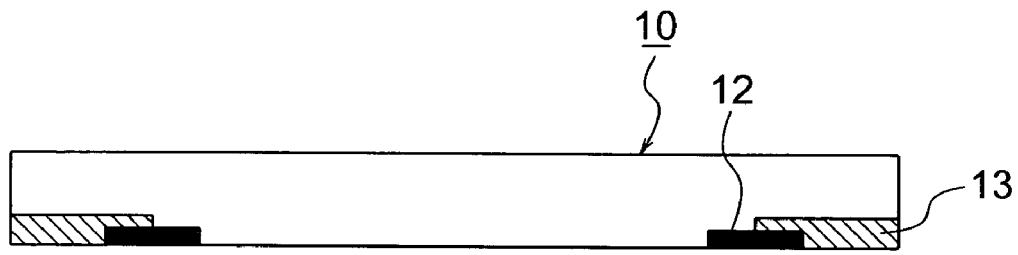
FIG. 20 is a cross sectional view schematically showing outline of a construction of an embodiment of a protective plate of a display device according to the invention.

FIGS. 18, 19 and 20, respectively, are cross sectional views schematically showing outline of structures of embodiments of a protective plate relating to a display device of the invention.

FIG. 18 shows a transparent flattened layer 14 provided on a surface of a protective plate 10 toward a display panel, that is, a surface formed with the colored layers.

For the flattened layer 14, it is possible to use inorganic materials such as oxides such as $SiO_2$, $Al_2O_3$, etc. and nitrides such as SiN, AlN, etc., or organic materials such as acrylic resin, benzo cyclobutene resin, polyimide resin, etc.

In this case, since the difference in level, caused by the colored layers on the protective plate is flattened, bubbles generated due to the colored layers are restricted.

Both FIGS. 19 and 20 show structures, in which a difference in level is provided in a region, in which colored layers are formed, on a surface of a protective plate 10 toward a display panel, and any difference in level is not generated, which projects toward the display panel, when colored layers 12, 13 are formed. The protective plate 10 illustrated in FIG. 19 is structured so that any difference in level is not generated, which projects toward the display panel, when colored layers 12, 13 are formed, by denting and inclining a surface, on which the colored layers are formed. Also, the protective plate 10 illustrated in FIG. 20 is structured so that a dented step is provided on that portion, on which colored layers are formed, and the step becomes substantially flat when the colored layers 12, 13 are formed. In this case, since a difference in level, caused by the colored layers on the protective plate and projecting toward the display panel is absent, bubbles generated due to a difference in level, of the colored layers are restricted.

Figure 21:
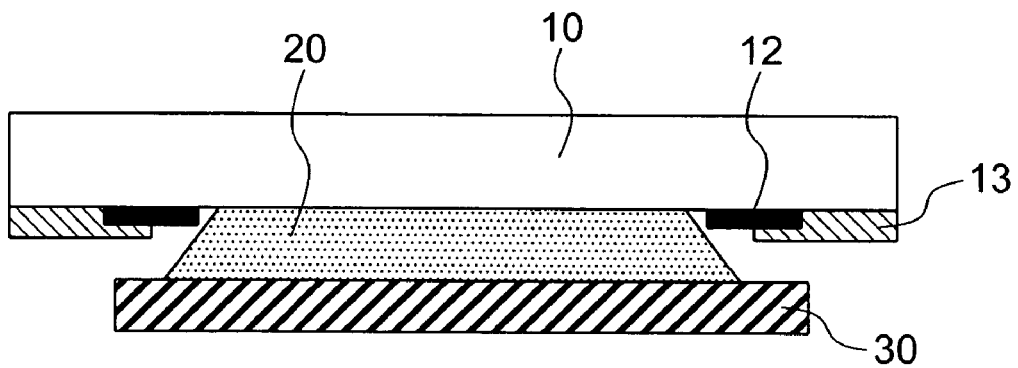
FIG. 21 is a cross sectional view schematically showing outline of a construction of an embodiment of a display device according to the invention.
Figure 22:
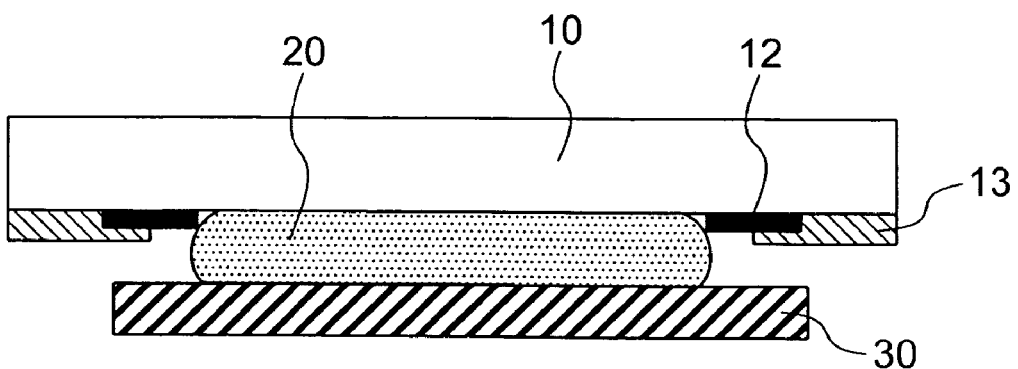
FIG. 22 is a cross sectional view schematically showing outline of a construction of an embodiment of a display device according to the invention.

Also, FIGS. 21 and 22, respectively, are cross sectional views schematically showing outline of structures of embodiments of a display device of the invention. The display device 1 according to the embodiments also comprises a display panel 30, a protective plate 10 arranged on a front surface of the display panel, and an optically transparent layer 20 filled between the protective plate 10 and the display panel 30, and the same members as those in the embodiments described above are denoted by the same reference numerals, and a detailed explanation therefor is omitted.

FIG. 21 is a cross sectional view schematically showing the case where an end of the optically transparent layer 20 is cut obliquely so that the end is made thin in thickness and a surface thereof having a large width is arranged toward the display panel. In this case, even when differences in level, caused by colored layers 12, 13 are present on a surface of the protective plate 10 toward the display panel 30, bubbles generated due to differences in level, of the colored layers are restricted by directing that surface of an end of the optically transparent layer, which is small in width, toward the display panel 10 and arranging the end of the optically transparent layer so as not to come into contact with an end of the colored layer 12.

FIG. 22 is a cross sectional view schematically showing the case where an end of the optically transparent layer 20 is shaped to bulge outwardly in a substantially semi-spherical manner so that the thickness of the end of the optically transparent layer is thinner than the thickness of a central portion thereof. In this case, even when differences in level, caused by colored layers 12, 13 are present on a surface of the protective plate 10 toward the display panel 30, bubbles generated due to differences in level, of the colored layers are restricted by arranging the end of the optically transparent layer so as not to come into contact with an end of the colored layer 12 on the protective plate 10. Also, in the case where the optically transparent layer is larger in coefficient of thermal expansion than the display panel and environmental temperature is low, the optically transparent layer shrinks larger than the display panel but the optically transparent layer is liable to absorb dimensional changes caused by temperature drop since the end of the optically transparent layer bulges outwardly in a substantially semi-spherical manner.

Figure 23:
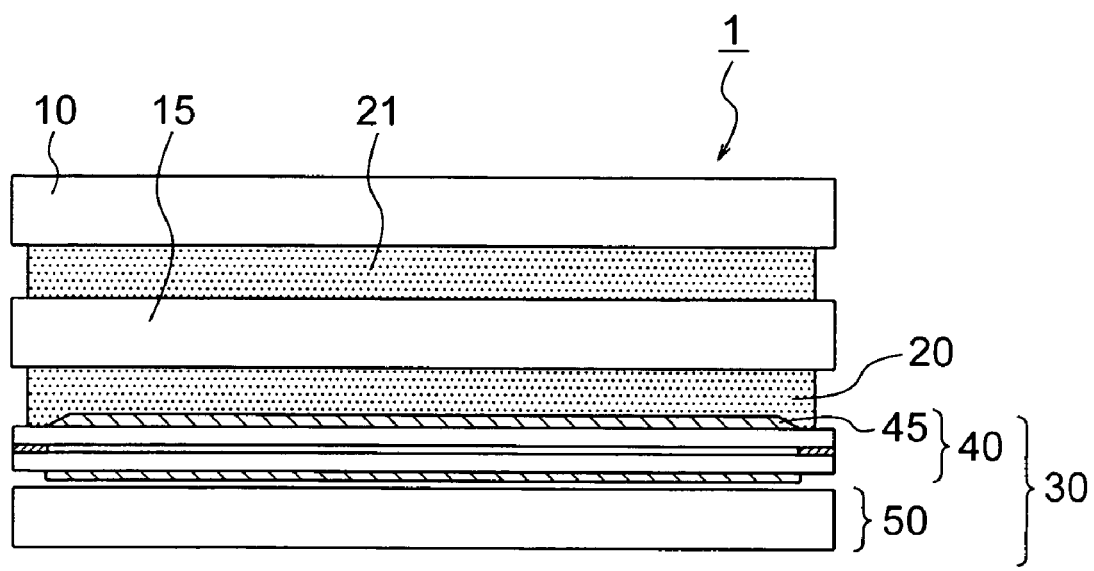
FIG. 23 is a cross sectional view schematically showing outline of a construction of an embodiment of a display device according to the invention.

Subsequently, an explanation will be given to other embodiment of a display device of the invention. FIG. 23 is a cross sectional view schematically showing outline of a structure of an embodiment of a display device of the invention. The display device 1 comprises a display panel 30, a protective plate 10 arranged on a front surface of the display panel, and an optically transparent layer 20 filled between the protective plate 10 and the display panel 30, and the same members as those in the embodiment described above are denoted by the same reference numerals, and a detailed explanation therefor is omitted.

The embodiment has a feature in comprising a further optically transparent plate 15 between the protective plate 10 and the display panel 30 and optically transparent layers 20, 21, respectively, between the display panel 30 and the optically transparent plate 15 and between the optically transparent plate 15 and the protective plate 10.

For the optically transparent plate 15, it is possible like the protective plate 10 to use a transparent plate almost free of absorption in visible wavelength range. Specifically, it is possible to use a plate made of a transparent resin such as acrylic, polycarbonate, etc. and a glass plate.

The optically transparent layers 20, 21 decrease in reflection on boundary surfaces with the display panel 30 and the optically transparent plate 15 and with the optically transparent plate 15 and the protective plate 10 as the refractive index thereof is close in value to those of the display panel, the optically transparent plate, and the protective plate. That is, in order to lessen unnecessary reflection, it is required that a difference in refractive index between the optically transparent layer, and the display panel, the optically transparent plate, and the protective plate be small.

Therefore, in order not to increase kinds of materials, it is desired that an optically transparent layer of the same material be used for the optically transparent layers 20, 21 and besides the same material be used for the optically transparent plate 15 and the protective plate 10.

In order to clearly observe a display region (screen) of the display panel 30, it is desirable to make the optically transparent plate 15 larger in area than at least the display region.

According to the embodiment, in the case where a mechanical force is applied to the protective plate 10 from outside, the force is also applied to the two optically transparent layers 20, 21 and the optically transparent plate 15, so that the force applied to the display panel 30 can be dispersed.

Figure 24:
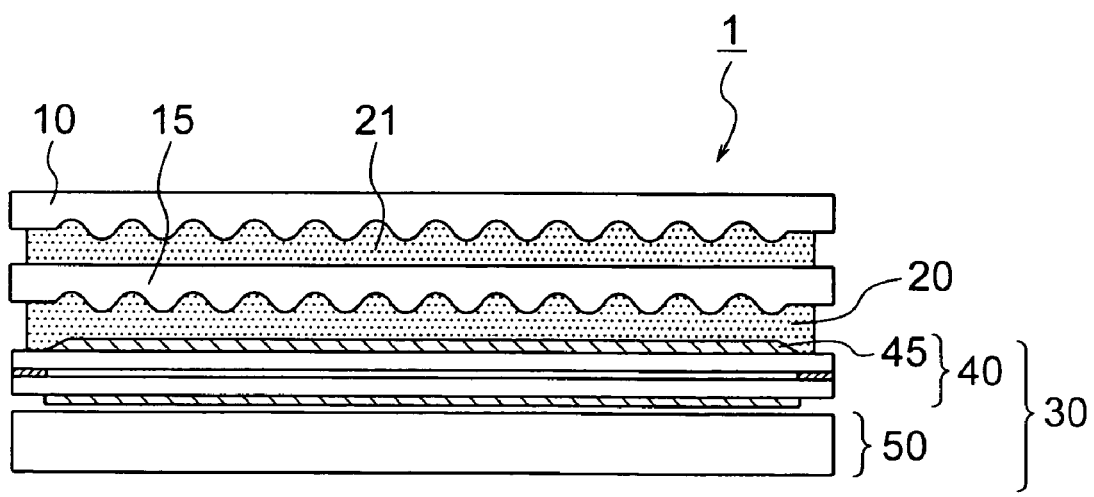
FIG. 24 is a cross sectional view schematically showing outline of a construction of an embodiment of a display device according to the invention.

In addition, in order to restrict bubbles remaining in the optically transparent layers, fine concavity and convexity configurations may be formed on surfaces of the protective plate 10 and of the optically transparent plate 15 toward the display panel 30 in the embodiment. FIG. 24 is a cross sectional view schematically showing outline of a structure of an embodiment of a display device of the invention. The display device 1 comprises a display panel 30, an optically transparent plate 15 and a protective plate 10, which are arranged on a front surface of the display panel, and optically transparent layers 20, 21, respectively, filled between the display panel 30 and the optically transparent plate 15 and between the optically transparent plate 15 and the protective plate 10, and the same members as those in the embodiments described above are denoted by the same reference numerals, and a detailed explanation therefor is omitted.

In this case, bubbles trapped when the protective plate 10 and the optically transparent layer 21, or the optically transparent plate 15 and the optically transparent layer 20 are brought into contact with each other release from clearances between the concavities and convexities formed on the protective plate and the optically transparent plate upon application of pressure, so that it is possible to inhibit bubbles from remaining. That is, since even in case of using a sheet-shaped material for the optically transparent layers 20, 21, bubbles are inhibited from remaining, it is possible to realize a display device, in which reflection of external light is small and an image of high quality is obtained even in a bright environment.

In addition, in case of forming fine concavity and convexity configurations on the protective plate 10 and the optically transparent plate 15, the optically transparent layer 20 is beforehand brought into close contact with the display panel 30. At this time, in case of using a sheet-shaped material for the optically transparent layer 20, it is easy to bring the material into close contact with the display panel 30 without residue of bubbles provided that the sheet-shaped optically transparent layer has the elasticity in the order of 1 to $3 \times 10^5$ Pa. Also, after the display panel 30 and the optically transparent plate 15 are brought into close contact with each other through the optically transparent layer 20, the optically transparent layer 21 is brought into close contact with a front side of the optically transparent plate 15. At this time, in case of using a sheet-shaped material for the optically transparent layer 21, it is easy to bring the material into close contact with the display panel 30 without residue of bubbles provided that the sheet-shaped optically transparent layer has an elasticity in the order of 1 to $3 \times 10^5$ Pa.

In addition, when fine concavity and convexity configurations formed on the optically transparent plate 15 and the protective plate 10 are groove-shaped and directions of the grooves are made substantially perpendicular to each other, projections on the optically transparent plate 15 and the protective plate 10 function also as ribs, and in the case where a mechanical force is applied from outside, deflections of the optically transparent plate 15 and of the protective plate 10 are restricted and it is possible to restrict a force applied to the display panel 30.

Figure 25:
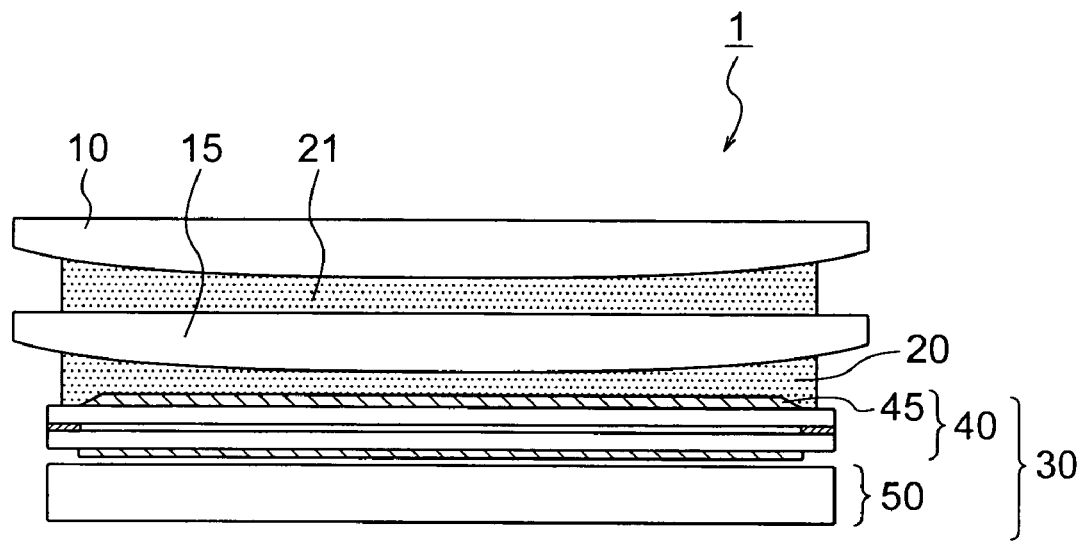
FIG. 25 is a cross sectional view schematically showing outline of a construction of an embodiment of a display device according to the invention.

In addition, apart from this, centers and/or neighborhoods of the centers of surfaces of the protective plate 10 and the optically transparent plate 15 toward the display panel 30 may be bulged from peripheries thereof. FIG. 25 is a cross sectional view schematically showing outline of a structure of an embodiment of a display device of the invention. The display device 1 comprises a display panel 30, an optically transparent plate 15 and a protective plate 10, which are arranged on a front surface of the display panel, and optically transparent layers 20, 21, respectively, filled between the display panel 30 and the optically transparent plate 15 and between the optically transparent plate 15 and the protective plate 10, and the same members as those in the embodiments described above are denoted by the same reference numerals, and a detailed explanation therefor is omitted.

In this case, when the protective plate 10 and the optically transparent layer 21, or the optically transparent plate 15 and the optically transparent layer 20 are brought into contact with each other, the protective plate 10 and the optically transparent layer 21, or the optically transparent plate 15 and the optically transparent layer 20 begin to come into contact with each other from centers and/or neighborhoods of the centers and bubbles are pushed toward peripheries thereof upon application of pressure, so that it is possible to inhibit bubbles from remaining.

Figure 26:
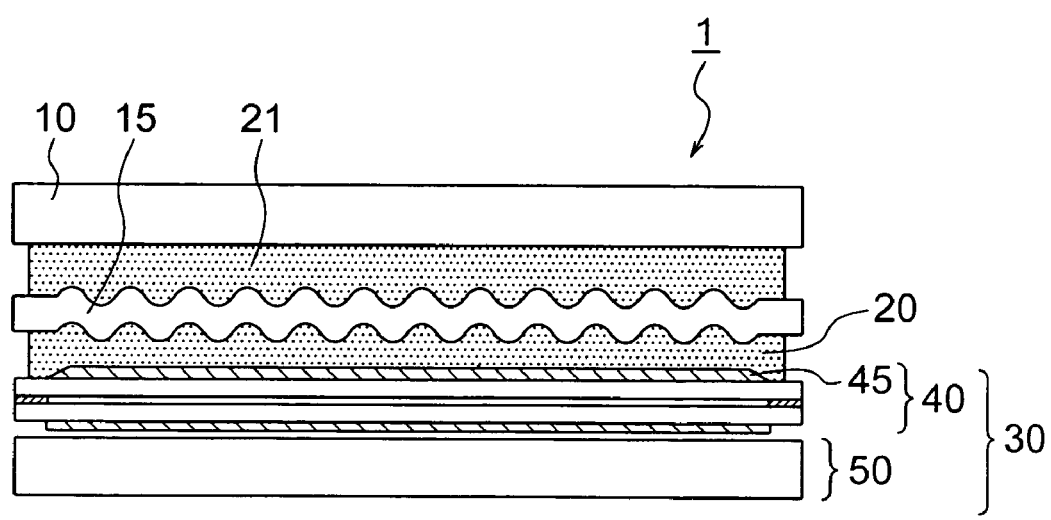
FIG. 26 is a cross sectional view schematically showing outline of a construction of an embodiment of a display device according to the invention.

Further, apart from this, in order to restrict bubbles remaining in the optically transparent layers, fine concavity and convexity configurations may be formed on both surfaces of the optically transparent plate toward the protective plate 10 and toward the display panel. FIG. 26 is a cross sectional view schematically showing outline of a structure of an embodiment of a display device of the invention. The display device 1 comprises a display panel 30, an optically transparent plate 15 and a protective plate 10, which are arranged on a front surface of the display panel, and optically transparent layers 20, 21, respectively, filled between the display panel 30 and the optically transparent plate 15 and between the optically transparent plate 15 and the protective plate 10, and the same members as those in the embodiments described above are denoted by the same reference numerals, and a detailed explanation therefor is omitted.

In this case, while fine concavity and convexity configurations may be provided on a surface of the protective plate 10 toward the display panel 30 in order to restrict bubbles remaining, the protective plate 10 may be in the form of a flat plate.

In the case where the protective plate 10 is in the form of a flat plate, the optically transparent layer 21 is beforehand brought into close contact with the protective plate 10. At this time, in case of using a sheet-shaped material for the optically transparent layer 21, it is easy to bring the material into close contact with the protective plate 10 without residue of bubbles provided that the sheet-shaped optically transparent layer has the elasticity in the order of 1 to $3 \times 10^5$ Pa.

In this case, by forming grooves, which comprise fine concavity and convexity configurations extending in different directions, on surfaces of the optically transparent plate 15 toward the protective plate 10 and toward the display panel 30, it becomes easy to remove bubbles remaining between the optically transparent layer and the optically transparent plate and since projections on the optically transparent plate function also as ribs, it is possible to restrict deflection of the optically transparent plate to restrict a force applied to the display panel in the case where a mechanical force is applied from outside.

Figure 27:
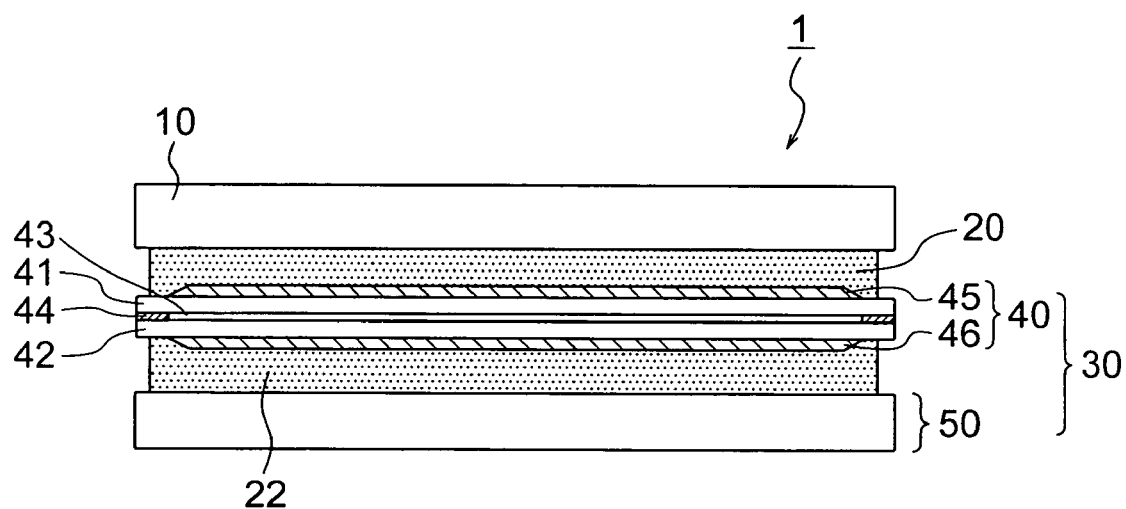
FIG. 27 is a cross sectional view schematically showing outline of a construction of an embodiment of a display device according to the invention.

Subsequently, an explanation will be given to other embodiment of a display device of the invention. FIG. 27 is a cross sectional view schematically showing outline of a structure of an embodiment of a display device of the invention. The display device 1 comprises a display panel 30, a protective plate 10 arranged on a front surface of the display panel, and an optically transparent layer 20 filled between the protective plate 10 and the display panel 30, and the same members as those in the embodiment described above are denoted by the same reference numerals, and a detailed explanation therefor is omitted.

The embodiment has a feature in that a liquid crystal display panel is used for the display panel 30, the liquid crystal display panel comprises a liquid crystal cell 40 and a backlight 50, and an optically transparent layer 22 of the same material as that of the optically transparent layer 20 is arranged between the liquid crystal cell 40 and the backlight 50.

In this case, since the liquid crystal cell 40 is sandwiched between the two optically transparent layers 21, 22, the liquid crystal cell is inhibited from warping due to changes in environmental temperature, being disordered in display, and being deformed mechanically even in the case where the optically transparent layers are different in coefficient of thermal expansion from the liquid crystal cell.

In particular, when a side light system is used for the backlight 50 and a transparent body used for a light guide plate therefor and a transparent body used for the protective plate are made of the same material such as acrylic resin, cyclooelfine resin, polycarbonate resin, etc., or a material having equivalent coefficients of thermal expansion, the display device is inhibited from warping, being disordered in display, and being deformed mechanically even in the case where the respective constituent elements are different in coefficient of thermal expansion from one another, since the whole display device is of a substantially symmetric structure with the liquid crystal cell centered.

Figure 28:
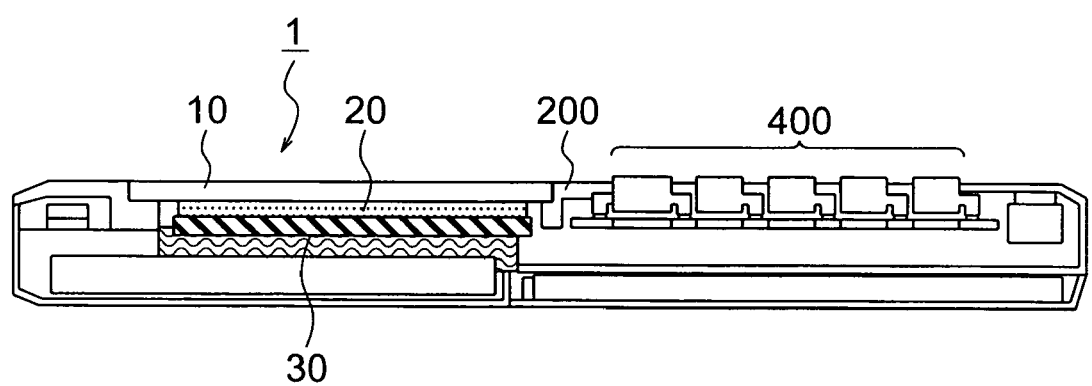
FIG. 28 is a cross sectional view schematically showing outline of a construction of an embodiment of an appliance provided with a display device according to the invention.
Figure 29:
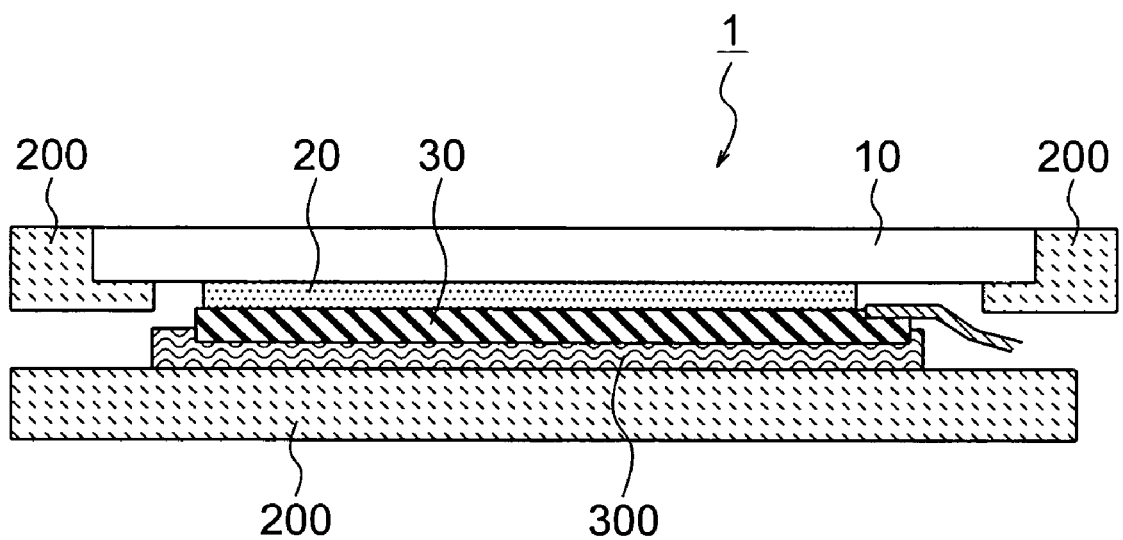
FIG. 29 is a partial, cross sectional view schematically showing outline of a construction of an appliance provided with a display device according to the invention, in the vicinity of the display device.

Subsequently, an explanation will be given to an appliance, in which the display device of the invention is provided. FIG. 28 is a cross sectional view schematically showing outline of a structure of an embodiment of an appliance, in which the display device of the invention is provided. Also, FIG. 29 is a partial, cross sectional view schematically showing outline of a structure of the appliance, in which the display device of the invention is provided, in the vicinity of the display device.

The appliance comprises input means 400 composed of ten keys, etc., a display device 1, which comprises a protective plate 10, an optically transparent layer 20, and a display panel 30, and a housing 200 that holds the input means 400 and the display device 1.

The display device 1 comprises the display panel 30, the protective plate 10 arranged on a front surface of the display panel, and an optically transparent layer 20 filled between the protective plate 10 and the display panel 30, and the same members as those in the embodiments described above are denoted by the same reference numerals, and a detailed explanation therefor is omitted. The protective plate 10 is larger in area than the display panel 30 and the display panel 30 is bonded to the protective plate 10 by means of the optically transparent layer 20.

Further, the display device 1 is fixed to the housing 200 by the protective plate 10 with an adhesive tape or the like, and a cushion member 300 such as sponge or the like is provided on a back surface side of the display panel 30.

In this case, a mechanical force applied to the display device from outside is applied to the protective plate 10 and the housing 200 of the appliance and a force applied to the display panel 30 can be restricted, so that any inconvenience is hard to be generated in display.

While the embodiments have been described, the invention is not limited thereto and it is apparent to those skilled in the art that various changes and modifications can be made within the spirit of the invention and a scope of the appended claims.

The invention claimed is:

1. A display device comprising:
a display panel;
a transparent protective plate arranged on a front surface side of the display panel; and
an optically transparent sheet arranged between the display panel and the transparent protective plate;
wherein the transparent sheet is bonded on the display panel and the transparent protective plate is bonded on the transparent sheet; and
wherein the transparent protective plate includes fine concavity configurations and fine convexity configurations on at least a surface thereof facing the display panel.

2. A display device according to claim 1, wherein the fine concavity configurations and the fine convexity configurations formed on the transparent protective plate are wave-shaped without corners in cross section.

3. A display device according to claim 1, wherein the fine concavity configurations and the fine convexity configurations formed on the transparent protective plate are at least 1 μm but at most 25 μm in height, and a pitch of the fine concavity configurations and the fine convexity configurations is ½ or more than the height of the fine concavity configurations and the fine convexity configurations.

4. A display device comprising:
a display panel;
a transparent protective plate arranged on a front surface side of the display panel; and
an optically transparent sheet arranged between the display panel and the transparent protective plate;
wherein the transparent sheet is bonded on the display panel, and the transparent protective plate is bonded on the transparent sheet; and
wherein at least a center and/or neighborhood of the center of a surface of the transparent protective plate facing the display panel is bulged from a periphery thereof.

5. A display device according to claim 4, wherein a bulging amount of the transparent protective plate facing the display panel is smaller than a thickness of the optically transparent sheet.

6. A display device comprising:
a display panel;
a transparent protective plate arranged on a front surface side of the display panel; and
an optically transparent sheet arranged between the display panel and the transparent protective plate;
wherein the transparent sheet is bonded on the display panel, and the transparent protective plate is bonded on the transparent sheet; and
wherein the transparent protective plate comprises a nano pore layer including voids having a magnitude of several nano to several tens of nano on at least a surface thereof facing the display panel.

7. A display device comprising:
a display panel;
a transparent protective plate arranged on a front surface side of the display panel; and
an optically transparent sheet arranged between the display panel and the transparent protective plate;
wherein the transparent sheet is bonded on the display panel, and the transparent protective plate is bonded on the transparent sheet; and
wherein the optically transparent sheet is thinner at an end thereof than a central portion thereof.

8. A display device comprising:
a display panel;
a transparent protective plate arranged on a front surface side of the display panel; and
an optically transparent sheet arranged between the display panel and the transparent protective plate;
wherein the transparent sheet is bonded on the display panel, and the transparent protective plate is bonded on the transparent sheet; and
wherein a colored layer formed in a frame is provided on a side of the transparent protective plate facing the display panel; and wherein a flattened layer for flattening a surface of the colored layer is further provided on the colored layer.

9. A display device comprising:
a display panel;
a transparent protective plate;
optically transparent sheets;
an optically transparent plate provided between the display panel and the transparent protective plate;
wherein the optically transparent plate and the transparent protective plate are arranged on a front surface side of the display panel; and
wherein the optically transparent sheets are respectively provided between the display panel and the optically transparent plate, and between the optically transparent plate and the transparent protective plate;
wherein the transparent protective plate is bonded on the transparent sheet; and
wherein the optically transparent plate and the transparent sheets are bonded on the display panel.

10. A display device comprising:
a display panel;
a transparent protective plate arranged on a front surface side of the display panel; and
a first optically transparent sheet arranged between the display panel and the transparent protective plate;
wherein the transparent protective plate is bonded on the optically transparent sheet, and the optically transparent sheet is bonded on the display panel; and
wherein the display panel comprises:
    a liquid crystal display panel including a liquid crystal cell and a backlight, and
    a second optically transparent sheet, substantially the same as the first optically transparent sheet, arranged between the liquid crystal cell and the backlight.

11. An appliance provided with a display device, which comprises:
a display panel;
a transparent protective plate arranged on a front surface side of the display panel; and
an optically transparent sheet arranged between the display panel and the transparent protective plate; and
wherein the transparent protective plate is larger in area than the display panel, and the display panel is bonded to the transparent protective plate by the optically transparent sheet; and
wherein the transparent protective plate is fixed to a housing to thereby fix the display device to the appliance.

12. A display device according to claim 1, wherein the display panel comprises:
a liquid crystal display panel including a liquid crystal cell and a backlight; and
another optically transparent sheet, substantially the same as the optically transparent sheet, arranged between the liquid crystal cell and the backlight.

13. A display device according to claim 4, wherein the display panel comprises:
a liquid crystal display panel including a liquid crystal cell and a backlight; and
another optically transparent sheet, substantially the same as the optically transparent sheet, arranged between the liquid crystal cell and the backlight.

14. A display device according to claim 6, wherein the display panel comprises:
a liquid crystal display panel including a liquid crystal cell and a backlight; and
another optically transparent sheet, substantially the same as the optically transparent sheet, arranged between the liquid crystal cell and the backlight.

15. A display device according to claim 7, wherein the display panel comprises:
a liquid crystal display panel including a liquid crystal cell and a backlight; and
another optically transparent sheet, substantially the same as the optically transparent sheet, arranged between the liquid crystal cell and the backlight.

16. A display device according to claim 8, wherein the display panel comprises:
a liquid crystal display panel including a liquid crystal cell and a backlight; and
another optically transparent sheet, substantially the same as the optically transparent sheet, arranged between the liquid crystal cell and the backlight.

17. A display device according to claim 9, wherein the display panel comprises:
a liquid crystal display panel including a liquid crystal cell and a backlight; and
another optically transparent sheet, substantially the same as the optically transparent sheet, arranged between the liquid crystal cell and the backlight.

18. An appliance provided with a display device according to claim 11, wherein the display panel comprises:
a liquid crystal display panel including a liquid crystal cell and a backlight; and
another optically transparent sheet, substantially the same as the optically transparent sheet, arranged between the liquid crystal cell and the backlight.

19. A display device according to claim 1, wherein at least one of the transparent protective plate and the transparent sheet has a refractive index of 1.4 to 1.6.

20. A display device according to claim 1, wherein the fine concavity configurations and the fine convexity configurations are arranged to inhibit bubbles from remaining when the transparent protective plate and the optically transparent sheet are brought into contact with one another.

21. A display device according to claim 4, wherein at least one of the transparent protective plate and the transparent sheet has a refractive index of 1.4 to 1.6.

22. A display device according to claim 19, wherein the fine concavity configurations and the fine convexity configurations are arranged to inhibit bubbles from remaining when the transparent protective plate and the optically transparent sheet are brought into contact with one another.

23. A display device according to claim 6, wherein at least one of the transparent protective plate and the transparent sheet has a refractive index of 1.4 to 1.6.

24. A display device according to claim 7, wherein at least one of the transparent protective plate and the transparent sheet has a refractive index of 1.4 to 1.6.

25. A display device according to claim 8, wherein at least one of the transparent protective plate and the transparent sheet has a refractive index of 1.4 to 1.6.

26. A display device according to claim 9, wherein at least one of the transparent protective plate and the transparent sheet has a refractive index of 1.4 to 1.6.

27. A display device according to claim 10, wherein at least one of the transparent protective plate and the transparent sheet has a refractive index of 1.4 to 1.6.

28. A display device according to claim 11, wherein at least one of the transparent protective plate and the transparent sheet has a refractive index of 1.4 to 1.6.

* * * * *